United States Patent
Deshwal et al.

(10) Patent No.: US 12,111,835 B2
(45) Date of Patent: Oct. 8, 2024

(54) QUERY GENERATION AND PROCESSING SYSTEM

(71) Applicant: NetSpring Data, Inc., Redwood City, CA (US)

(72) Inventors: Priyendra Singh Deshwal, Saratoga, CA (US); Vijay Krishnan Ganesan, Saratoga, CA (US); Abhishek Rai, Palo Alto, CA (US); Satyam Shekhar, San Jose, CA (US); Jordan Farr Hannel, San Francisco, CA (US)

(73) Assignee: NetSpring Data, Inc., Redwood City, CA (US)

( * ) Notice: Subject to any disclaimer, the term of this patent is extended or adjusted under 35 U.S.C. 154(b) by 0 days.

(21) Appl. No.: 17/969,264

(22) Filed: Oct. 19, 2022

(65) Prior Publication Data

US 2023/0120592 A1    Apr. 20, 2023

Related U.S. Application Data

(60) Provisional application No. 63/257,317, filed on Oct. 19, 2021.

(51) Int. Cl.
*G06F 16/00* (2019.01)
*G06F 16/2452* (2019.01)
*G06F 16/2455* (2019.01)

(52) U.S. Cl.
CPC .. *G06F 16/24568* (2019.01); *G06F 16/24528* (2019.01); *G06F 16/2456* (2019.01)

(58) Field of Classification Search
CPC ......... G06F 16/24568; G06F 16/24528; G06F 16/2456; G06F 16/24544
See application file for complete search history.

(56) References Cited

U.S. PATENT DOCUMENTS

2007/0203893 A1* 8/2007 Krinsky .................. G06F 16/33
2021/0294797 A1* 9/2021 Gupta .................... G06N 20/00
(Continued)

OTHER PUBLICATIONS

Norris, Jack, What's Fueling The Move To A Converged Data Platform?, The Next Platform Newsletter, Jun. 7, 2016, 8 pages, Stackhouse Publishing Inc, <https://www.nextplatform.com/2016/06/07/whats-fueling-move-converged-data-platform/>.
(Continued)

*Primary Examiner* — Paul Kim
(74) *Attorney, Agent, or Firm* — Young Basile Hanlon & MacFarlane, P.C.

(57) ABSTRACT

A query generation and processing system includes a relational data store, a query generator, and a query processor. The relational data store stores data ingested from data sources in a first and second datasets. The query generator interprets a data expression in a simplified query language to generate a query in a structured query language based on identifying quads corresponding to the first and second datasets in the data expression and determining an implicit join between the quads based on an unambiguous relationship obtainable from a schema of the first and datasets, in which the data expression does not expressly identify a join between the first quad and the second quad. The query processor generates a query pipeline that uses the data of the first and second datasets stored by the relational data store to execute the query generated by the query processor.

15 Claims, 15 Drawing Sheets

(56) References Cited

U.S. PATENT DOCUMENTS

2022/0374431 A1* 11/2022 Kavali ................ G06F 16/2471
2023/0127572 A1* 4/2023 Jacob ................. G06F 16/2423
707/755

OTHER PUBLICATIONS

Dageville et al.; The Snowflake Elastic Data Warehouse, SIGMOD/PODS'Jun. 26-Jul. 1, 2016, San Francisco, CA, pp. 215-226, retrieved from https://event.cwi.nl/lsde/papers/p215-dageville-snowflake.pdf.

Beganovic, Deep dive on caching in Snowflake, Sonra, The Data Liberation Company, Mar. 5, 2018, 4 pages, retrieved from https://sonra.io/snowflake/deep-dive-on-caching-in-snowflake/.

Apache Flink, Stateful Stream Processing, Sep. 16, 2021, 3 pages, retrieved from https://nightlies.apache.org/flink/flink-docs-master/docs/concepts/stateful-stream-processing/.

Qadah, An Introduction to Stream Processing with Apache Flink, Jan. 7, 2020, 4 pages, retrieved from https://towardsdatascience.com/an-introduction-to-stream-processing-with-apache-flink-b4acfa58f14d.

* cited by examiner

QUERY GENERATION AND PROCESSING SYSTEM

CROSS-REFERENCE TO RELATED APPLICATION(S)

This application claims the benefit of U.S. Provisional Application No. 63/257,317, filed Oct. 19, 2021, the entire disclosure of which is herein incorporated by reference.

BACKGROUND

Modern enterprises are increasingly data-focused and reliant on data analysis such as to manage and automate operations and to identify operational inefficiencies and opportunities. The datasets used are often extremely large and continue growing each day. The data may be state-based, such as historical data with values measurably in one state or another, event-based, such as real-time data with values that change over time, or some combination thereof. Given the challenges in utilizing voluminous and complex data, many enterprises use sophisticated software tools configured to collect, store, query, and analyze historical or real-time data.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
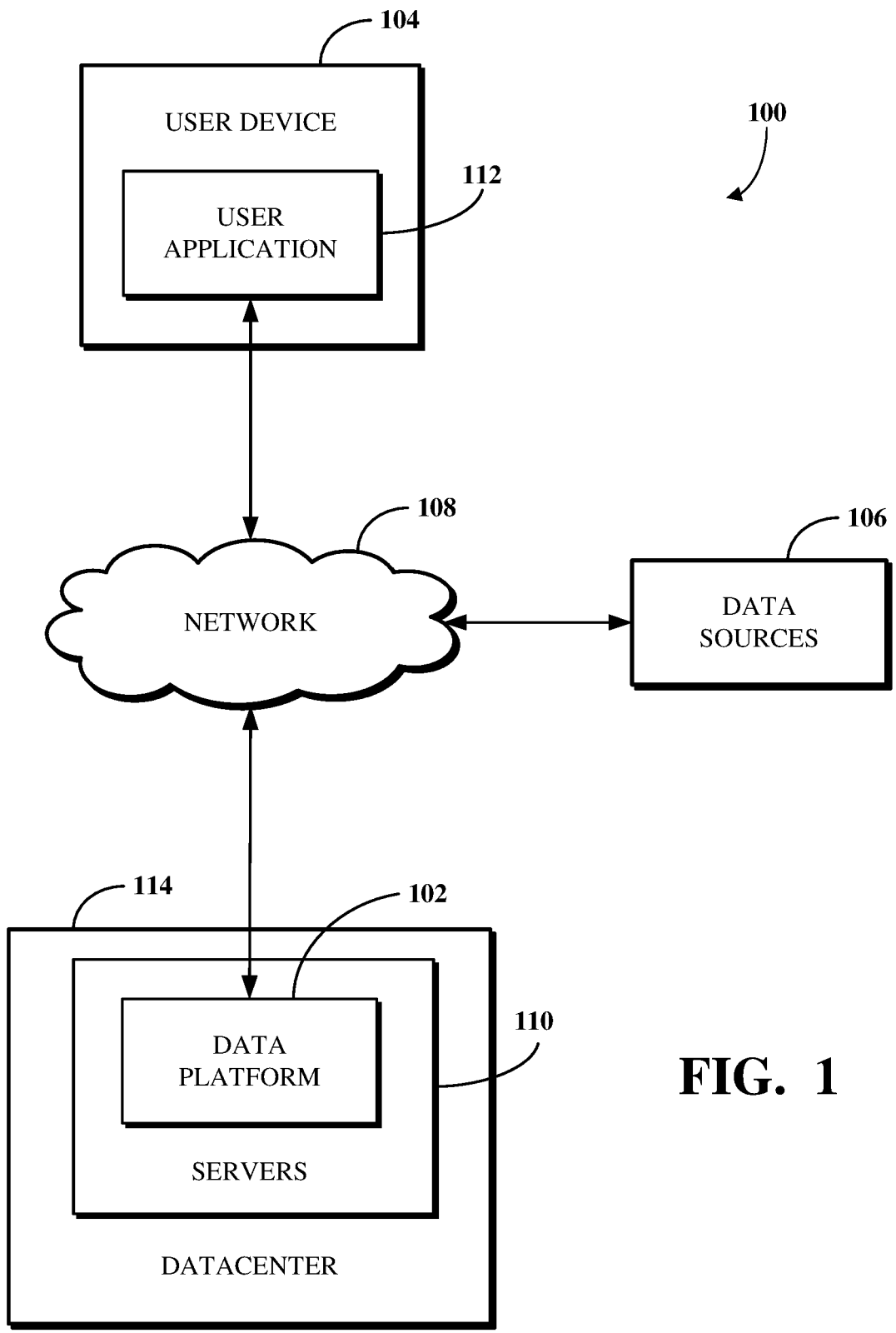
FIG. 1 is a block diagram of an example of a computing system which includes a data platform.

Aspects of this disclosure relate to a data platform capable of ingesting, processing, querying, analyzing batch and streaming data, or combinations thereof. In some implementation a data platform may be implemented as or used as an operational intelligence platform. For example, an operational intelligence platform may include a suite of development and runtime software tools that monitor, alert and support interactive decision making by providing data and analytics about current conditions. Such platforms may have adapters to receive and send data; event processing logic to detect threats and opportunities; rule processing; analytics; dashboards; alerting facilities; and capabilities to trigger responses in applications, devices or workflow tools; or combinations thereof. Such platforms may apply to the operational aspects of a business. Business operations are activities such as those that produce, deliver or directly enable goods, services and information products. Applications built on operations intelligence platforms may work at the oversight level; in some implementations they may not directly control work at a detailed level.

Existing software used with complex and voluminous data has various shortcomings that this disclosure and implementations of a data platform described herein address. For example, existing solutions may not be optimally designed for workloads that include both batch and streaming data, may include separately designed and/or implemented components that operate together in a sub-optimal way, may require data expressions that are unnecessarily complex and unsuited to expression re-use, or combinations thereof.

Implementations of a data platform may include a query generation component that takes as input a data expression according to a simplified query language. The simplified query language allows for the omission of join qualifications in the typical case where join qualifications are unambiguously obtainable from a data schema that pertain to the datasets being queried. The query generation component may include parsing the data expression into a tree of "quads" which may take the form of an abstract syntax tree and may include an intermediate step of transforming the data expression (e.g., into prefix notation). A schema to which the data expression pertains may be processed (or pre-processed) to generate a base derivation graph having nodes for datasets and/or columns in the schema and edges describing derivation relationships between datasets and/or columns in the schema. A derivation graph for the data expression is built from the base derivation graph, for example by adding nodes and edges for quads by recursively processing the tree of quads. The derivation graph may then be queried according to one or more grains (e.g., dimensions by which the quads are to be grouped) of the quads in the tree of quads to obtain relevant derivation relationships that can be utilized to generate join relationships between the quads in order to produce a query in a complex query language (e.g., structured query language (SQL), such as standardized in ISO/IEC 9075).

Implementations of a data platform may also include a data ingress component that obtains data and a data store management component that stores data and makes data available to a query processing component. For example, the data ingress component may obtain data regarding the operation of software and hardware relating to a company's information technology operations using local agents or by accessing APIs through which such data may be obtained. For example, the data store management component may store and make data available to the query generation component in parallel, and/or may make data available using memory mapping techniques so as to avoid copying of the data in memory. In another example, the data store management component may predictively keep certain subsets of data in memory longer based on patterns of past usage of datasets to which the subsets of data pertain. In another example, the data store management component may determine whether to store and/or maintain subsets data in local storage, cold storage, or some other form of storage based on an assessment of likelihood of whether respective subsets are likely to be queried based on patterns of past usage of datasets.

Implementations of a data platform may also include a query processing component that takes as input a structured query expression (e.g., from the query generation component) and executes the structured query expression against ingested data (e.g., from the data store management component) to produce query results. For example, the query processing component may access the ingested data using a shared memory provided by the data store management component. In another example, the query processing component may share metadata regarding queries with the data store management component to permit the data store management component to better evaluate where to store and how long to keep in memory ingested data.

More specifically, existing approaches to data processing do not include or otherwise unify query generation, data store management, and query processing components as are described above. In particular, existing software fails to address both the functionality of query generation, data store management, and query processing components or the combination of such components within a data platform as disclosed herein.

For example, existing solutions for writing queries for processing complex and voluminous data rely upon sophisticated query languages, such as SQL, to express complicated and specific data requests. The reliance upon such query languages has various shortcomings relating to the limitations and complexities of those languages as well as the high demand for compute resources spent executing queries written in those languages. For example, a software user who wishes to write comprehensive queries, which can sometimes tens of lines or more, must have a sophisticated understanding of the query language to do so. In another example, the user must explicitly identify all join relationships between datasets, columns, and like schema elements within the query as the query languages like SQL are incapable of inferring or otherwise determining such join relationships. In yet another example, the user must rewrite new queries for each data request in that queries written in SQL and like query languages are not reusable without being imported in their entirety from a source (e.g., the query cannot be easily parsed and modified to include new instructions without complicated work that is prone to introducing issues within the query itself). Thus, even where a query can be written in SQL or another query language, the design of existing solutions for writing query makes it highly challenging to effectively and efficiently parse and use such queries.

In another example, existing query processing software relies upon external data store management software, and vice versa. Existing data processing solutions thus do not include both a data store management component and a query processing component. For example, query processing software may leverage external data management software such as Snowflake to process and store data to use for query execution. In another example, data management software may leverage external query processing software such as Apache Flink® to execute queries based on stored data. However, this separation results in numerous drawbacks due to the disparate designs and specifications of the software. For example, the use of query processing software with external data management software requires data to be written to disk before it can be made available for querying. Furthermore, the design differences in and rigidity of use of external software prevent optimizations which may otherwise be available between data management and query processing software, such as by enabling changes to in-memory data storage based on operations at a query execution pipeline. For example, the inability of external data management software to natively obtain information about queries being executed adds latency into the query execution process by requiring all data to be obtained from disk at the time of query execution rather than maintained in-memory beforehand. In another example, existing software which performs joins in streaming query systems, which use constantly-updating datasets, typically re-compute full joins with each dataset update rather than performing incremental updates based on in-memory maintenance of datasets which do not change or are less likely to change.

Implementations of this disclosure address problems such as these by using a query generation and processing system which includes a relational data store, a query generator, and a query processor. The relational data store stores data ingested from data sources in a first and second datasets. The query generator interprets a data expression in a simplified query language to generate a query in a structured query language based on identifying quads corresponding to the first and second datasets in the data expression and determining an implicit join between the quads based on an unambiguous relationship obtainable from a schema of the first and datasets, in which the data expression does not expressly identify a join between the first quad and the second quad. The query processor generates a query pipeline that uses the data of the first and second datasets stored by the relational data store to execute the query generated by the query processor. For example, the relational data store may be implemented using a data store management component as disclosed herein, the query generator may be implemented using a query generation component as disclosed herein, and the query processor may be implemented using a query processing component as disclosed herein.

To describe some implementations in greater detail, reference is first made to examples of hardware and software structures used to implement a query generation and processing system. FIG. 1 is a block diagram of an example of a computing system 100 which includes an data platform 102. The data platform 102 includes software for continuous monitoring of large scale streaming and batch data such as to generate near real-time alerts. A user of the data platform 102, such as a user of a user device 104, can configure the data platform 102 to obtain data from one or more data sources 106 over a network 108. The user can define metrics and rules in the data platform 102 software that are evaluated on a periodic or event-driven basis to detect expected or unexpected data patterns, constraint violations, or data anomalies using the data obtained from the data sources 106. Where applicable, the data platform 102 may notify the user about conditions such as these using alerts delivered in one or more configurable manners. While the foregoing are examples of certain types of batch and streaming data that may be obtained from data sources 106, such examples are non-limiting and other types of batch or streaming data may be utilized instead or in addition.

The user device 104 is a computing device capable of accessing the data platform 102 over the network 108, which may be or include, for example, the Internet, a local area network (LAN), a wide area network (WAN), a virtual private network (VPN), or another public or private means of electronic computer communication. For example, the user device 104 may be a mobile phone, a tablet computer, a laptop computer, a notebook computer, a desktop computer, or another suitable computing device. In some cases, the user device 104 may be registered to or otherwise associated with a customer of the data platform 102. The data platform 102 may be created and/or operated by a service provider and may have one or more customers, which may each be a public entity, private entity, or another corporate entity or individual that purchases or otherwise uses software services of the data platform 102. Without limitation, the data platform 102 can support hundreds or thousands of customers, and each of the customers may be associated with or otherwise have registered to it one or more user devices, such as the user device 104.

The data sources 106 are computing devices which temporarily or permanently store data processable by the data platform 102. As shown, the data sources 106 are external to the data platform 102 and the computing aspects which implement it (i.e., the servers 110, as introduced below). The data sources 106 in at least some cases are thus computing devices operated other than by a customer of the data platform 102. For example, a data source external to the data platform 102 may be or refer to a computing device wholly or partially operated by a third party or by the service provider. Examples of such external data sources include, without limitation, instances of Apache Kafka®, Redshift®, Salesforce®, and Postgres®. In some implementations, however, a data source 106 may be or refer to a computing device operated by a customer of the data platform 102. For example, the data source 106 may be a computing device which stores internally generated or maintained transaction, user, or other operational data of the customer. In such a case, the data source 106 In some implementations, external data sources 106 may communicate with the data platform over a first network 108 (e.g., a WAN) and internal data sources 106 may communicate with the data platform 102 over a second network 108 (e.g., a LAN).

The data platform 102 is implemented using one or more servers 110, including one or more application servers and database servers. The servers 110 can each be a computing device or system, which can include one or more computing devices, such as a desktop computer, a server computer, or another computer capable of operating as a server, or a combination thereof. In some implementations, one or more of the servers 110 can be a software implemented server implemented on a physical device, such as a hardware server. In some implementations, a combination of two or more of servers 110 can be implemented as a single hardware server or as a single software server implemented on a single hardware server. For example, an application server and a database server can be implemented as a single hardware server or as a single software server implemented on a single hardware server. In some implementations, the servers 110 can include servers other than application servers and database servers, for example, media servers, proxy servers, and/or web servers.

An application server runs software services deliverable to user devices such as the user device 104. For example, the application servers of the servers 110 can implement all or a portion of the non-data store management-related software functionality of the data platform 102, including, without limitation, data ingress software, analytical configuration software, query processing software, and query generation software. The application servers may, for example, each be or include a unitary Java Virtual Machine (JVM).

In some implementations, an application server of the servers 110 can include an application node, which can be a process executed on the application server. For example, and without limitation, the application node can be executed in order to deliver software services to user devices such as the user device 104 as part of a software application of the data platform 102. The application node can be implemented using processing threads, virtual machine instantiations, or other computing features of the application server. In some such implementations, the application server can include a suitable number of application nodes, depending upon a system load or other characteristics associated with the application server. For example, and without limitation, the application server can include two or more nodes forming a node cluster. In some such implementations, the application nodes implemented on a single application server can run on different hardware servers.

A database server stores, manages, or otherwise provides data for delivering software services of the data platform 102 to user devices such as the user device 104. In particular, a database server of the servers 110 may implement one or more databases, tables, or other information sources suitable for use with a software application implemented using an application server, as described above. The database server may include a data storage unit accessible by software executed on the application server. A database implemented by the database server may be a relational database management system (RDBMS) which uses a relational-data model to store data in some table-based structure accessible using a query language, such as SQL. In some implementations, a database implemented by the database server may be other than a RDBMS, for example, an object database, an XML database, a configuration management database (CMDB), a management information base (MIB), one or more flat files, other suitable non-transient storage mechanisms, or a combination thereof. The servers 110 can include one or more database servers, in which each database server can include one, two, three, or another suitable number of databases configured as or comprising a suitable database type or combination thereof.

An application server instantiates the subject software service of the data platform 102 using corresponding data obtained from a database server. The application servers and database servers used to implement the data platform 102 may be made available as part of a cloud computing system. The data platform 102 may be implemented in a web application configuration, a server application in a client-server configuration, or another configuration. The user device 104 accesses the data platform 102 using a user application 112. The user application 112 may be a web browser, a client application, or another type of software application.

In one example, where the data platform 102 is implemented as a web application, the user application 112 may be a web browser, such that the user device 104 may access the web application using the web browser running at the user device 104. For example, the user device 104 may access a home page for the data platform 102 from which a software service thereof may be connected to, or the user device 104 may instead access a page corresponding to a software service thereof directly within the web browser at the user device 104. The user of the user device 104 may thus interact with the software service and data thereof via the web browser.

In another example, where the data platform 102 is implemented in a client-server configuration, the user application 112 may be a client application, such that the user device 104 may run the client application for delivering functionality of at least some of the software of the data platform 102 at the user device 104, which may thus be referred to as a client device. The client application accesses a server application running at the servers 110. The server application delivers information and functionality of at least some of the software of the data platform 102 to the user device 104 via the client application.

In some implementations, the data platform 102 may be on-premises software run at a site operated by a private or public entity or individual associated with the user device 104. For example, the data sources 106 may be sources available at that site and then network 108 may be a LAN which connects the data sources 106 with the servers 110. The data platform 102 may in some such cases be used to analyze and monitor data limited to that site operator.

In some implementations, a customer instance, which may also be referred to as an instance of the data platform, can be implemented using one or more application nodes and one or more database nodes. For example, the one or more application nodes can implement a version of the software of the data platform, and databases implemented by the one or more database nodes can store data used by the version of the software of the data platform. The customer instance associated with one customer may be different from a customer instance associated with another customer. For example, the one or more application nodes and databases used to implement the platform software and associated data of a first customer may be different from the one or more application nodes and databases used to implement the platform software and associated data of a second customer. In some implementations, multiple customer instances can use one database node, such as wherein the database node includes separate catalogs or other structure for separating the data used by platform software of a first customer and platform software of a second customer.

The computing system 100 can allocate resources of a computer network using a multi-tenant or single-tenant architecture. Allocating resources in a multi-tenant architecture can include installations or instantiations of one or more servers, such as application servers, database servers, or any other server, or combination of servers, which can be shared amongst multiple customers. For example, a web server, such as a unitary Apache installation; an application server, such as a unitary JVM; or a single database server catalog, such as a unitary MySQL catalog, can handle requests from multiple customers. In some implementations of a multi-tenant architecture, an application server, a database server, or both can distinguish between and segregate data or other information of the various customers of the data platform 102.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as random access memory (RAM), storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

The servers 110 are located at a datacenter 114. The datacenter 114 can represent a geographic location, which can include a facility, where the one or more servers are located. Although a single datacenter 114 including one or more servers 110 is shown, the computing system 100 can include a number of datacenters and servers or can include a configuration of datacenters and servers different from that generally illustrated in FIG. 1. For example, and without limitation, the computing system 100 can include tens of datacenters, and at least some of the datacenters can include hundreds or another suitable number of servers. In some implementations, the datacenter 114 can be associated or communicate with one or more datacenter networks or domains. In some implementations, such as where the data platform 102 is on-premises software, the datacenter 114 may be omitted.

The network 108, the datacenter 114, or another element, or combination of elements, of the system 100 can include network hardware such as routers, switches, other network devices, or combinations thereof. For example, the datacenter 114 can include a load balancer for routing traffic from the network 108 to various ones of the servers 110. The load balancer can route, or direct, computing communications traffic, such as signals or messages, to respective ones of the servers 110. For example, the load balancer can operate as a proxy, or reverse proxy, for a service, such as a service provided to user devices such as the user device 104 by the servers 110. Routing functions of the load balancer can be configured directly or via a domain name service (DNS). The load balancer can coordinate requests from user devices and can simplify access to the data platform 102 by masking the internal configuration of the datacenter 114 from the user devices. In some implementations, the load balancer can operate as a firewall, allowing or preventing communications based on configuration settings. In some implementations, the load balancer can be located outside of the datacenter 114, for example, when providing global routing for multiple datacenters. In some implementations, load balancers can be included both within and outside of the datacenter 114.

Figure 2:
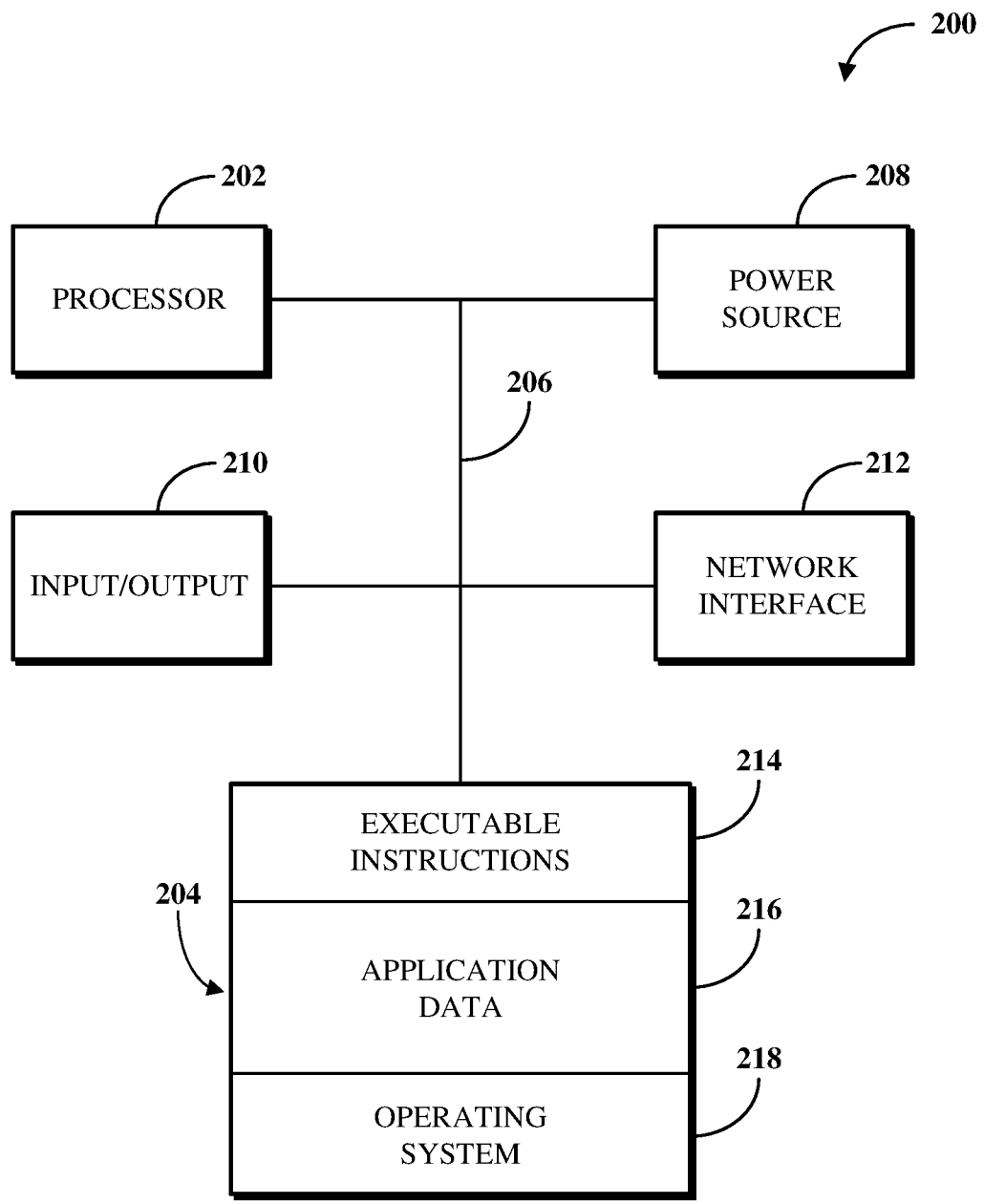
FIG. 2 is a block diagram of an example internal configuration of a computing device usable with a computing system.

FIG. 2 is a block diagram of an example internal configuration of a computing device 200 usable with a computing system, such as the computing system 100 shown in FIG. 1. The computing device 200 may, for example, implement one or more of the user device 104 or one of the servers 110 of the computing system 100 shown in FIG. 1.

The computing device 200 includes components or units, such as a processor 202, a memory 204, a bus 206, a power source 208, input/output devices 210, a network interface 212, other suitable components, or a combination thereof. One or more of the memory 204, the power source 208, the input/output devices 210, or the network interface 212 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. Generally speaking, with currently existing memory technology, volatile hardware provides for lower latency retrieval of data and is more scarce (e.g., due to higher cost and lower storage density) and non-volatile hardware provides for higher latency retrieval of data and has greater availability (e.g., due to lower cost and high storage density). The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 214, application data 216, and an operating system 218. The executable instructions 214 can include one or more application programs, which can be loaded or copied, in whole or in part, from non-volatile memory to volatile memory to be executed by the processor 202. For example, the executable instructions 214 can include instructions for performing some or all of the techniques of this disclosure. The application data 216 can include user data, database data (e.g., database catalogs or dictionaries), or the like. In some implementations, the application data 216 can include functional programs, such as a web browser, a web server, a database server, another program, or a combination thereof. The operating system 218 can be, for example, Microsoft Windows®, Mac OS X®, or Linux®, an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The input/output devices 210 include one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 212 provides a connection or link to a network (e.g., the network 108 shown in FIG. 1). The network interface 212 can be a wired network interface or a wireless network interface. The computing device 200 can communicate with other devices via the network interface 212 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
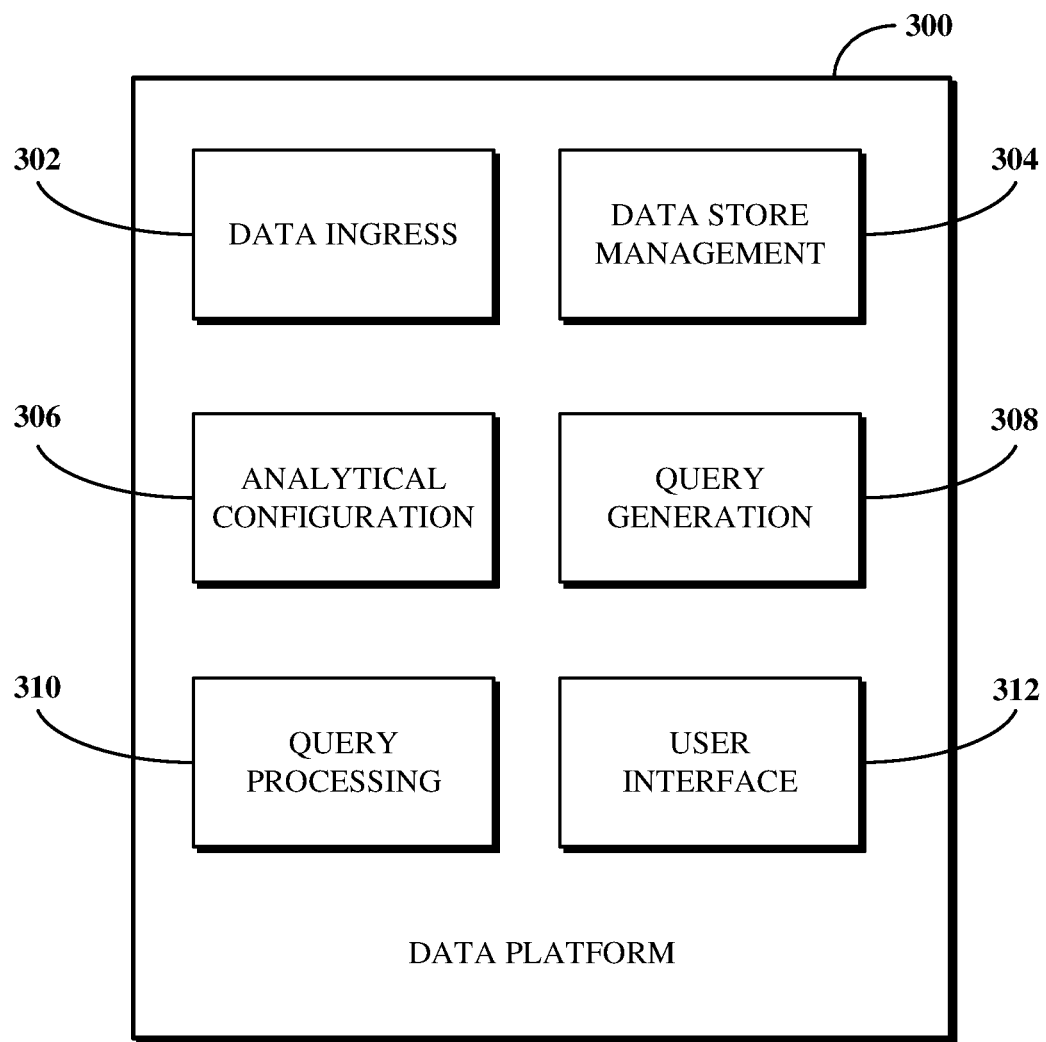
FIG. 3 is a block diagram of an example of a data platform.

FIG. 3 is a block diagram of an example of a data platform 300, which may, for example, be the data platform 102 shown in FIG. 1. The data platform 300 is accessible by user devices, for example, the user device 104 using the web browser software 112 (or a client application, as applicable) shown in FIG. 1. The data platform 300 includes components for data and query processing and analytics. As shown, the software of the data platform 300 includes a data ingression component 302, an analytical configuration component 304, a data store management component 306, a query processing component 308, a query generation component 310, and a user interface component 312.

As used herein, the term "component" can refer to a hardware component (e.g., infrastructure, such as a switch, router, server, modem, processor, integrated circuit, input/output interface, memory, storage, power supply, biometric reader, media reader, other sensor, or the like, or combinations thereof), a software component (e.g., a platform application, web application, client application, other software application, module, tool, routine, firmware process, or other instructions executable or interpretable by or in connection with one or more hardware components, or the like, or combinations thereof), or combinations thereof. A component can also refer to a computing feature such as a document, model, plan, socket, virtual machine, or the like, or combinations thereof. A component, such as a hardware component or a software component, can refer to a physical implementation (e.g., a computing device, such as is shown in FIG. 2) or a virtual implementation (e.g., a virtual machine, container, or the like that can, for example, execute on a physical device and mimic certain characteristics of a physical device) of one or more of the foregoing.

The components 302 through 312 may be implemented using one or more servers, for example, the servers 110 of the datacenter 114 shown in FIG. 1. In particular, one or more of the components 302 through 312 may be implemented using one or more application servers and database servers. In one example, each of the components 302 through 312 can be implemented using different application server nodes and/or database server nodes. In another example, some of the components 302 through 312 can be implemented using the same application server nodes and/or database server nodes while the others are implemented using different application server nodes and/or database server nodes. In yet another example, all of the components 302 through 312 can be implemented using the same application server nodes and/or database server nodes. Although the various components of the data platform 300 generally relates to data and query processing and analytics, the components may be utilized for query processing alone, data processing alone, or other suitable activities.

The data ingression component 302 obtains raw data used by the data platform 300 from one or more data sources, for example, the data sources 106 shown in FIG. 1. The data ingression component 302 may be configured by a user of the data platform 300 to connect to the various individual data sources using forms or like user interface elements. Raw data may be obtained from a data source using one or more mechanisms. In one example, raw data may be obtained via a push mechanism using a representational state transfer (REST) application programming interface (API) configured to connect the data ingression component 302 with a REST endpoint of a data source. In another example, raw data may be obtained via a pull mechanism using a dedicated listener including a streaming data processing pipeline that reacts to events from a connected data source (e.g., new data being added to an Amazon S3® bucket, a stream of change data capture updates from Postgres®, or messages added to a Kafka® bus). A user may configure as many connections to data sources as are required to obtain the data necessary for analysis by the data platform 300. The raw data may be obtained as part of a batch dataset or a streaming dataset.

The data store management component 304 processes the raw data obtained using the data ingression component 302 as ingested data to prepare the ingested data for immediate query processing using the query processing component 310, as will be described below. For example, the data store management component 304 may be a RDBMS. In another example, the data store management component 304 may be a database management system for NoSQL data. The data store management component 304 uses blazers, worker nodes arranged in clusters, and tabloids, table masters that communicate with blazers, to store the data in tables within a tiered storage system across one or more computing devices. The tiered storage system enables storage and movement of data within local memory buffers, warm storage devices (e.g., local hard drives), and cold storage devices (e.g., cloud storage). The data store management component 304 may use SQL or another query language for data load (e.g., of data manipulation language (DML) operations) and transaction processing. The data store management component 304 allows the data platform 300 to support fast data ingestion and low latency querying over streaming and batch datasets. In particular, the data store management component 304 may enable data to be ingested at rates higher than one million rows per second and to become available for operational monitoring (e.g., by query processing) within one second or less. In one example of a relational structure implemented by the data store management component 304, ingested data is stored in blocks, blocks are stored in pages, pages are stored in shards, and shards are stored in tables.

The analytical configuration component 306 obtains metrics and rules that are evaluated on a periodic or event-driven basis to detect expected or unexpected data patterns, constraint violations, or data anomalies using the ingested data processed and stored using the data store management component 304. The analytical configuration component 306 further permits the definition of alert mechanisms for indicating events based on the processing of ingested data using the defined metrics and rules. For example, a user of the data platform 300 may define metrics for measuring a number of transactions which occur over some discrete time interval and rules for determining when data events occur based on those metrics being met or exceeded. The user may also use the analytical configuration component 306 to configure the data platform 300 to present output indicative of the defined data events in one or more forms and to one or more connected systems (for example, as Kafka® topics, Slack® channels, emails, or PagerDuty® notifications).

The query generation component 308 generates queries (e.g., as query language instructions) in a query language (e.g., SQL) from data expressions written by a user of the data platform 300 in a simplified query language. The simplified query language allows a user of the data platform 300 to manipulate data using concise and reusable expressions that do not require the user to specify join relationships which are unambiguously discernable from the schema of the underlying data. A data expression written in the simplified query language provides a higher level of abstraction which permits the application common operations to those queries, rather than manipulating the subject data itself or affirmatively describing join relationships which may become increasingly complex with the addition of additional operators.

The query generation component 308 parses the data expression into a tree of "quads" which may take the form of an abstract syntax tree and may include an intermediate step of transforming the data expression into prefix notation. A schema to which the data expression pertains may be processed (or pre-processed) to generate a base derivation graph having nodes for datasets in the schema and edges describing derivation relationships between datasets in the schema. For example, the base derivation graph may be generated or updated when the schema is updated. A derivation graph for the data expression is built from the base derivation graph, for example by adding nodes and edges for quads by recursively processing the tree of quads. The derivation graph may then be queried according to one or more grains (e.g., dimensions by which the quads are to be grouped) of the quads in the tree of quads to obtain relevant derivation relationships that can be utilized to generate join relationships between the quads in order to produce a query in a complex query language (e.g., SQL, such as standardized in ISO/IEC 9075).

The quads are aggregated based on grains representing one or more dimensions of the data represented by the quads. As such, the concept of derivability as used herein may be understood to refer to whether first data (e.g., associated with a first grain) is derivable using second data (e.g., associated with a second grain). In this example, the first data is derivable from the second data if and only if the second data can be computed given the first data. A derivation relationship is directional in nature.

The simplified query language supports quads including constant, column, and dataset quads; aggregations to a single scalar value; joins of single output quads into a wider quad with multiple outputs; unary and binary functions; slicing of an input quad, which is most commonly some form of an aggregation (e.g., sum) by one or more dimensions which are often identified as grains; and filtering. A query generated using the query generation component 308 may be a batch query or a streaming query and may be manually or automatically made available to the query processing component 310.

The query processing component 310 is a converged analytical system. For example, the converged analytical system may combine certain components that typically are siloed, such as components for operational intelligence, data architecture optimization, event management, user experience management, and the like. The converged analytical system may be configured to evaluate metrics and rules defined by a user of the data platform 300 (e.g., using the analytical configuration component 306) to detect unexpected patterns, constraint violations, or anomalies identified by executing batch and streaming queries over rapidly changing datasets (e.g., millions of updates per second). The query processing component 310 executes queries, such as those generated from simplified query language data expressions using the query generation component 308, to determine query results usable for analytical and monitoring purposes, as described above. The query processing component 310 processes an input query to determine a logical plan for executing the query, and then processes the logical plan to determine a physical plan for executing the query. The logical plan is a tree of relational operations that describes the computations required for a query to execute. The physical plan includes a network of compute nodes instantiated as a query execution pipeline based on the tree of relational operations. The query execution pipeline is a hierarchically arranged pipeline which includes faucets and turbines. A faucet is a temporary holding point for data to be processed by one or more downstream turbines. A turbine is a compute node that performs some part of the computation for executing a subject query. Faucets regulate the flow of logical shard data indicating how a collection of data being processed is consumed for execution to turbines. Accordingly, a query execution pipeline starts with a source faucet at a highest level, ends with a downstream faucet at a lowest level, and has at least one intermediate level of turbines (and intermediate faucets, if there is more than one intermediate level of turbines) in which an upstream faucet passes information as input to a turbine which in turns passes output information to a downstream faucet at the next level. The process repeats until the downstream faucet at the lowest level is reached—this data is the output of the query. The output of the query processing component 310 for a batch query is a one-time result value. The output of the query processing component 310 for a streaming query is a result value which is aggregated with later-obtained local results on a discrete time interval basis.

The user interface component 312 includes elements configured across one or more sections of the data platform 300 (e.g., webpages at which the components 302 through 310 is made available) for interaction by a user of the data platform 300. The user interface component 312 may include one or more graphical user interfaces (GUI) of the data platform 300 generated and output for display as part of the components 302 through 310. For example, the data can contain rendering instructions for bounded graphical display regions, such as windows, or pixel information representative of controls, such as buttons and drop-down menus. The rendering instructions can, for example, be in the form of hypertext markup language (HTML), standard generalized markup language (SGML), JavaScript, Jelly, AngularJS, or other text or binary instructions for generating a GUI on a display that can be used to generate pixel information. A structured data output can be provided to an input of a display of a user device, such as the user device 104, so that the elements provided on the display screen represent the underlying structure of the output data. An API may also be provided to permit interaction with the data platform 300, requests to which may be manually initiated by a user or may be generated on an automatic basis.

Figure 4:
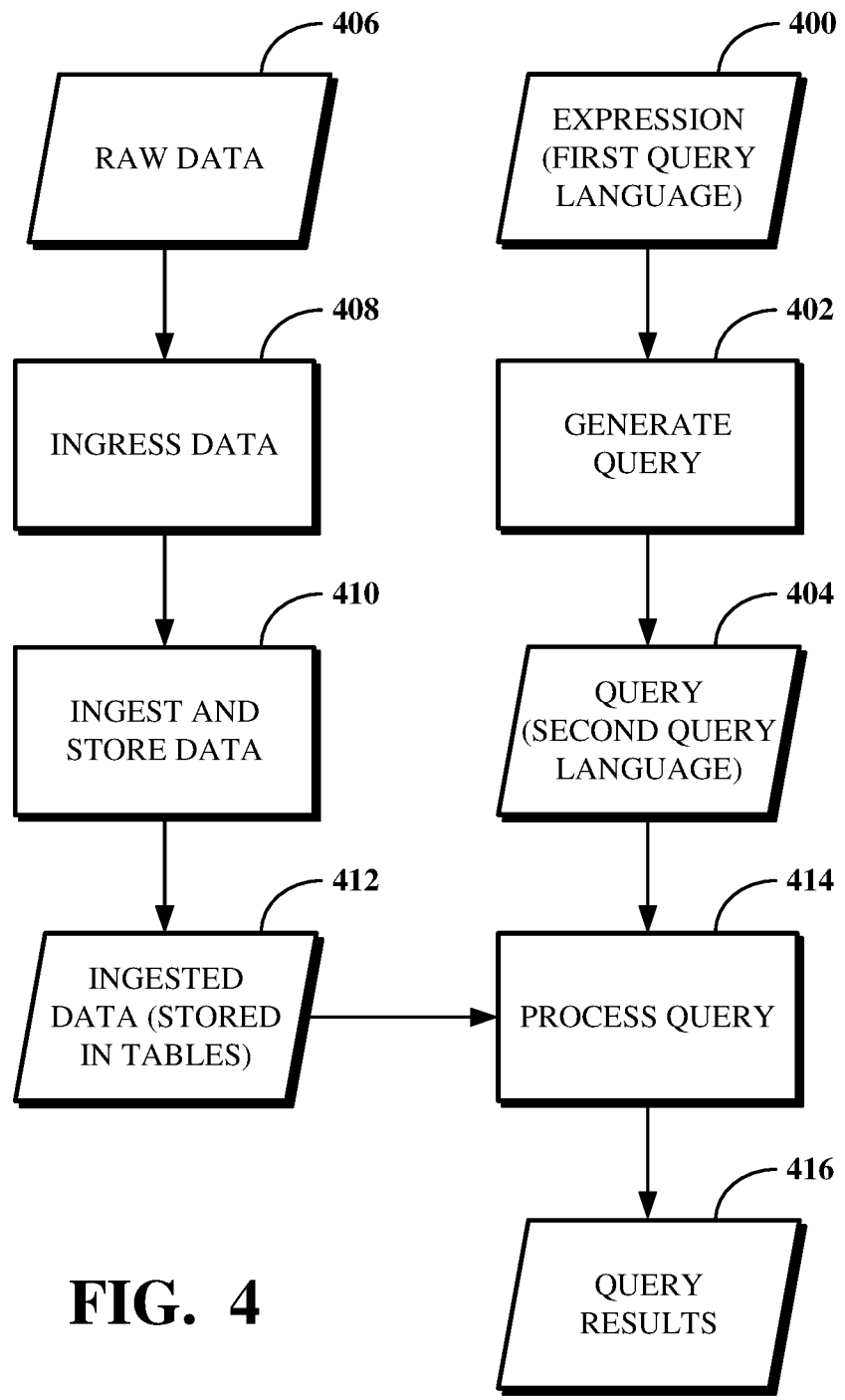
FIG. 4 is a block diagram of an example process in the context of a data platform.

FIG. 4 is a block diagram of an example process in the context of a data platform, such as the data platform 300 shown in FIG. 3. The process includes data aspects processed and operations performed against same using components of the data platform, such as the components 302 through 312 shown in FIG. 3. The workflow may operate for batch queries and streaming queries based on a data expression written by a user of and raw data ingested by the data platform. For both types of queries, the process takes as input an expression in a simplified query language and raw data ingested from data sources as input and produces query results as output. In the case of a streaming query, the process is repeated as additional data is obtained.

An expression 400 in a first, simplified query language is provided to the data platform and is processed at query generation 402 (e.g., using the query generation component 308 shown in FIG. 3) to generate a query 404 in a second query language, such as a data query and/or data manipulation language (e.g., SQL). At some point, which may be before, after, or concurrently with the generation of the query 404, raw data 406 is obtained at data ingression 408 (e.g., using the data ingression component 302 shown in FIG. 3) from one or more data sources and is then ingested and stored 410 (e.g., using the data store management component 304 shown in FIG. 3) which results in ingested data 412 stored in one or more tables. The query 404 is obtained and the ingested data 412 is accessed within a tiered storage system (e.g., within a low-latency memory buffer) for query processing 414 (e.g., using the query processing component 310 shown in FIG. 3) such as by the execution of the query 404 against the ingested data 412 to obtain query results 416. For example, the query may be executed by dynamically generating a high level language program implementing the query and compiling the high level language program into machine language which is then executed by a processor. The query results 416 may then be used for analytical and monitoring purposes, such as according to metrics and rules defined by a user of the data platform.

Figure 5:
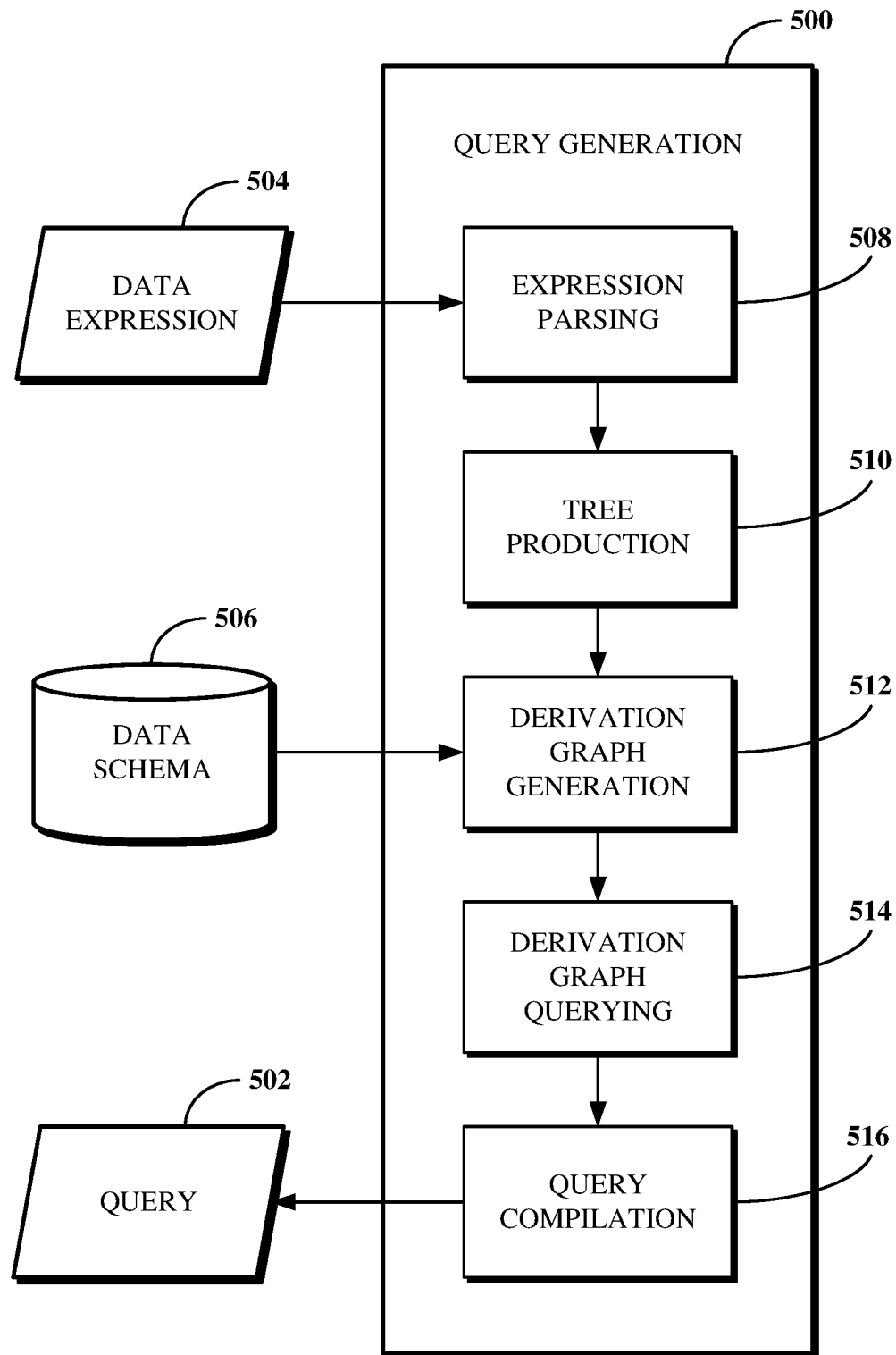
FIG. 5 is a block diagram of an example of query generation performed using a data platform.

FIG. 5 is a block diagram of an example of query generation performed using a data platform, such as the data platform 300 shown in FIG. 3. The query generation is performed using a query generation component 500 of the data platform, which may, for example, be the query generation component 308 shown in FIG. 3. The query generation component 500 includes tools, such as programs, subprograms, functions, routines, subroutines, operations, and/or the like for generating a query 502 in a second query language (e.g., SQL) from a data expression 504 in a first, simplified query language using data schema 506 which includes elements mappable to quads of the data expression 504. As shown, the query generation component 500 includes an expression parsing tool 508, a tree production tool 510, a derivation graph generation tool 512, a derivation graph querying tool 514, and a query compilation tool 516.

The data expression 504 is written in a simplified query language processible by the query generation component 500. The simplified query language is structured to allow for concise expressions that do not require the specification of join relationships which are unambiguously discernable from the schema of the underlying data and that can be used to generate a query in the second query language. Data expressions in the simplified query language are written at a high level of abstraction to allow for the generation of complex queries and to permit common analytical operations using the simplified query language, rather than manipulating the subject data itself or generating the complex query directly.

The data expression 504 includes expressions called quads which can be converted into a query in the second query language. For example, a quad may refer to a table column, a dataset, a combination of columns, a combination of datasets, or a combination of columns and datasets. Quads are aggregated based on grains representing one or more dimensions of the data represented by the quads. Quads are joined based on and output measures are aggregated at a grain, which, for example, may be a single column, collection of columns, a computed value, or some other basis. Examples of quads which may be included in the data expression 504 include constants representing scalar (i.e., dimension-less) values, datasets, columns of datasets, aggregations for aggregating a quad or the result of a join between quads down to a single scalar value, dataframes representing the result of joining a number of single output quads into a wider quad with the same number of outputs, unary and binary functions which are applied on each output of an input quad including unary operators, slices representing the result of slicing an input quad (most commonly an aggregation quad) by one or more dimensions, filters representing Boolean single valued quads applied to other quads, and combinations thereof.

The grammar of the simplified query language may support at least constant, column, and dataset quads; aggregations to a single scalar value; joins of single output quads into a wider quad with multiple outputs; unary and binary functions; slicing of an input quad, which is most commonly some form of an aggregation (e.g., sum) by one or more dimensions which are often identified as grains; and filtering. Data expressions in the simplified query language may include a "|" operator analogous to Unix pipes to pass the output from a quad before the pipe as input to a quad after the pipe. In this way, quads can easily be connected together to model analytical operations (e.g., applying filters, aggregating by some dimension, and joining intermediate results on some shared dimension) and grammatically delineate between quads and those analytical operations.

The data expression 504 may be written within an online development environment or a local development environment, may be imported, or some combinations thereof. In some cases, the online development environment may be part of the data platform. In other cases, the online development environment may be external to the data platform, in which case the data platform can either import the data expression 504 from the external online development environment or obtain it by a user manually entering the data expression 504 within a form, field, or other element of the data platform. In some implementations, the data expression 504 may be programmatically generated at the data platform.

The grammar and syntax of the simplified query language is designed to permit reusability of the data expression 504. The data expression 504 is considered reusable where it can be combined with another data expression and processed to generate a query which is different from the query 502. For example, a variable may be defined to represent data expression 504. One or more further data expressions may then include that variable. For example, a first variable (representing a first data expression) may be multiplied by, divided by, or grouped by a second variable (representing a second data expression). This reusability of data expressions enabled by the simplified query language allows the data platform to effectively maintain a library of data expressions which may be re-used within new data expressions in the future. This reusability is not possible with SQL and like query languages because of their express recitation of joins which change and become increasingly complex as additional columns, datasets, and operations are added to the query.

Generally, elements of the data schema 506 which are associated with a given quad will be readily identifiable based on the quad itself. For example, a quad User.Discount will be understood to refer to the Discount column within the User dataset. However, in some implementations, the relationship may be ambiguous, and aliases may be used to resolve ambiguities in which data to use based on characteristics of the data schema 506. For example, certain cases may occur where a first dataset has two foreign key relationships with a second dataset. In the foregoing example, there may be two columns each having an identifier referring to the User dataset. In such a case, aliases may be defined for the User dataset as "Buyer" and "Seller." The quad Buyer.Discount or Seller.Discount would thus resolve in the same manner as the quad User.Discount. The aliases may be defined by a user of the data platform rather than by the data platform itself to avoid ambiguities which the data platform may be designed to not resolve (e.g., in the case of an ambiguity, an error may result).

The expression parsing tool 508 obtains the data expression 504 and parses it to determine the quads which are included in it. In particular, the expression parsing tool 508 parses the data expression 504 to determine the quads by tokenizing a string of the data expression 504 to identify the quads, parsing a stream of the tokenized string into a syntax stream, and normalizing the syntax stream into a canonical form. Tokenizing the string of the data expression 504 includes separating the data expression 504 into smaller portions representative of individual quads based on character delineations between the quads (e.g., spaces or operators, such as pipes). The stream of the tokenized string including the identified quads is parsed into a syntax stream representing the structure and grammar of the simplified query language. The syntax stream is then normalizing into a canonical form so that parameters and variables referred to in the data expression 504 are bound to a uniform format. The expression parsing tool 508 may, for example, begin parsing the data expression 504 responsive to a system request to execute data expression 504 or responsive to a user of the data platform indicating to do so (e.g., by interacting with a "generate query" or like user interface element).

The tree production tool 510 produces a tree of quads based on an arrangement of the quads of the normalized syntax stream within the data expression 504 and based on a grammar of the simplified query language. Producing the tree of quads includes converting the quads of the normalized syntax stream into a relational algebraic form. The relational algebraic form of the quads is a hierarchical expression of the quads of the data expression 504. The tree of quads includes a number of leaves in which each leaf except a topmost leaf has a parent and each leaf except the one or more bottommost leaves has one or more children. Each leaf of the tree of quads represents a quad of the data expression 504, and each quad of the data expression 504 is represented by one leaf of the tree of quads. The tree expresses both data and relational operators for using the data hierarchically arranged according to the expression of the respective quads within the data expression 504. Because the tree of quads is produced based on the arrangement of the quads within the data expression 504 rather than based on relationships between the quads, the tree of quads does not generally express directions of derivability between the quads (with the exception of column relationships which may be shown by the "." operator).

The derivation graph generation tool 512 uses the tree of quads produced using the tree production tool 510 and the data schema 506 to generate a derivation graph. The derivation graph is a directional graph of nodes representing quads of the tree of quads and other quads representative of datasets and columns in the data schema 506, in which sets of two or more nodes are connected using edges defining derivation relationships between the quads represented by the connected nodes. The specific form of the derivation graph may differ provided that it includes something to represent the quads and something to indicate connections represent derivation relationships between the quads.

A derivation relationship between two quads identifies one of those quads as a derived quad and the other as a deriving quad, in which values of the derived quad can be obtained based on values of the deriving quad. For example, if the symbol "<" represents derivability, a<b if and only if a is derivable from b. In that quads are aggregated at a grain, the concept of derivability may thus refer to the quality of data associated with one grain being derivable using the data associated with another grain. Nodes and edges are added to the derivation graph 512 by recursively iterating through the tree of quads and by traversing the data schema 506 beginning with the quads of the tree of quads. Edges may be added to the derivation graph 512 after or concurrent with the addition of respective nodes thereto. For example, edges may be added to the derivation graph 512 after all of the nodes to be included therein have been added to it.

There are generally three types of edges which may be used to connect nodes in the derivation graph, including column edges, relationship edges, and algebraic edges. Column edges are connections identified in the data schema 506 between dataset quads and column quads in those datasets. For example, where the data schema 506 defines that a dataset called Transaction that has a column ProductID, a column edge may connect a quad corresponding to the Transaction dataset and a quad corresponding to the Transaction.ProductID column.

Relationship edges are connections identified between foreign key and primary key relationships defined in the data schema 506 between a foreign key column quad to a primary key column quad. For example, where the data schema 506 with the Transaction dataset having the ProductID column also defines that a dataset called Products that has a column ID, the Transaction.ProductID column is a foreign key to the Product.ID column (alternatively, this relationship can be expressed as being between datasets or the foreign key column and the dataset of the primary key column). For this example relationship edge, Product is derivable from Transaction, e.g., Product<Transaction.ProductID<Transaction.

Algebraic edges are connections identified between elements within the data schema 506 that are not directly related, but are determined to be connectable in a derivation relationship through one or more intermediate quads based on grains of the respective quads. For example, although a column User.Discount within a dataset User does not have a column edge or relationship edge with a column Product-.Promotion within the Product dataset, an algebraic edge connection may be identified, for example if the derivation graph includes a node (e.g., a root node, as described below) representative of a Transaction dataset that includes both a UserId column having a foreign key to the User dataset and a ProductID column having a foreign key to the Product dataset. While the number of column edges and relationship edges in the derivation graph is bounded by the size of the data schema 506, there may theoretically be a very large number of algebraic edges in the derivation graph. While the derivation graph generally will include all the datasets and columns in the data schema 506, certain implementations may restrict the size of the derivation graph and therefore may omit certain datasets or columns. For example, in an implementation, a column having an edge only with its dataset (e.g., no relationship edges) might be omitted.

The derivation graph querying tool 514 determines join relationships between the quads in the data expression 504 by querying the derivation graph based on derivation chains associated with the nodes representing the quads in the data expression 504. A derivation chain is a chain of edges linking nodes representing quads identified for a join within the data expression 504 through a number of intermediary nodes based on a common direction of derivability between the grains of those nodes. Derivation chains are usable to identify a join relationship by linking the quads associated with a join within the data expression either directly or through one or more intermediate columns, datasets, or other mappable elements of the data schema 506. The derivation graph querying tool 514 outputs the join relationships or data indicative thereof to be used to ultimately specify how the join should be expressed within the query 502.

Determining a derivation chain includes using the data schema 506 to identify a root node representing a highest deriving quad within a join of the data expression 504 and then linearly traversing edges from the root node to other nodes to eventually arrive at a node representing a lowest derived quad within the join of the data expression 504. In some cases, a derivation chain is between two nodes representing the quads to be joined as indicated within the data expression 504, such as where the edges along the derivation chain are all column edges or relationship edges. In such cases, the highest deriving node in the derivation chain is the root node. Where there are one or more algebraic edges along the derivation chain, one or more derivation chains may be determined and used to identify the join relationship. In particular, each derivation chain may be identified between a node representing one of the queries associated with the join and a root node which is not a query associated with the join, but rather which represents a quad which can either directly or indirectly derive another query associated with the join.

The root node can be identified using a function that traverses along a path of nodes connected by edges (e.g., potential edges which are available but may not ultimately be used to connect nodes or edges which have already been added to the derivation graph) within the derivation graph from a first node representing a quad associated with a join in the data expression 504 upward to a node (identified as the root node) which can be used to derive a second node representing another quad associated with a that join. For example, the function may check at each intermediate node along the path whether that intermediate node has or is capable of having an edge which either directly or indirectly (e.g., through one or more intermediate nodes) connects to the second node. In cases where two quads within the data expression 504 have independent grains such that they are not connected using column edges or relationship edges, two derivation chains—one for each of the quads—may be determined as having a common root node representing a schema element which has a grain that derives the grains of each of the two quads.

In some cases, the root node can be identified based on a transitive closure for the data expression 504. The transitive closure of the data expression 504 identifies edges which may be usable to connect nodes representative of the quads determined from the data expression 504. For example, for a join between first and second quads which have independent grains, identifying the root node for that join may include determining that a transitive closure of the root node includes at least one node representative of the first quad and at least one node representative of the second quad. The transitive closure may be determined using a depth-first search. For example, the root node may be identified by determining that the at least one node representative of the first quad and the at least one node representative of the second quad are each encountered only once during the depth-first search.

In an example used for illustrating the derivation graph querying, a portion of the data expression 504 may indicate to join the quads Transaction.Amount and Product.Discount in which each of those quads has a grain independent of the other. Querying the derivation graph based on these quads includes evaluating the data schema 506 to find a way to relate the rows of those quads and the relationship between the underlying datasets Transaction and Product. In particular, evaluating the Transaction and Product datasets as defined within the data schema 506 indicates that many rows of the Transaction dataset may map to a single row of the Product dataset, in which the mapping can be achieved by observing that the grain of the Product.Discount quad, Product, is derivable from the grain of the Transaction.Amount quad, Transaction. Accordingly, a derivation chain between Transaction.Amount and Product.Discount can be determined as Transaction>Transaction.ProductID>Product>Product.Discount, in which the operator ">" for a given set of two quads indicates that the quad on the left side is a deriving quad and the quad on the right side is a derived quad.

The query compilation tool 516 reads the quads from the data expression 504 and replaces them with query syntax determined by querying the derivation graph. For example, the query compilation tool 516 may translate the data expression 504 from the first, simplified query language into the query 502 in the second query language (e.g., SQL) by using joins computed by the querying of the derivation graph (e.g., based on derivations chains) to compute syntax representing those joins in the second query language. The query compilation tool 516 generates the query 502, which may then be output to a query processing component of the data platform, for example, the query processing component 310 shown in FIG. 3, for execution.

In some implementations, one or more of the tools 508 through 516 may be omitted or combined. For example, the derivation graph querying tool 514 may in some cases be configured to perform query compilation based on the data expression 504 and the join relationships determined by querying the derivation graph. In such a case, the query compilation tool 516 may be omitted. In another example, the functionality of the derivation graph generation tool 512 and of the derivation graph querying tool 514 may be combined into a single derivation graph processing tool.

Figure 6:
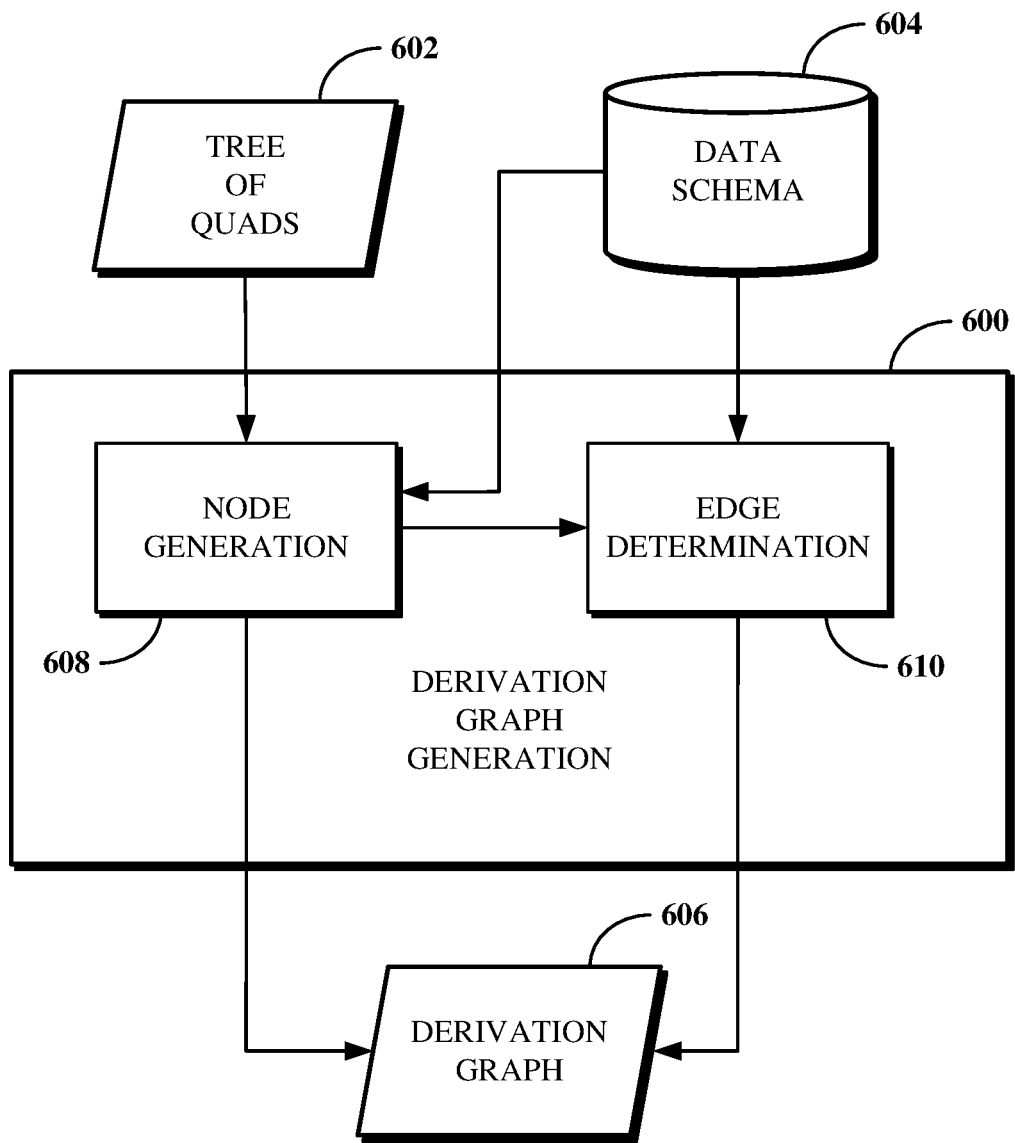
FIG. 6 is a block diagram of an example of derivation graph generation performed for query generation.

FIG. 6 is a block diagram of an example of derivation graph generation performed for query generation. The derivation graph generation performed using a derivation graph generation tool 600, which may, for example, be the derivation graph generation tool 512 shown in FIG. 5. The derivation graph generation tool 600 receives as input a tree of quads 602, for example, produced using the tree production tool 510 shown in FIG. 5, and a data schema 604, for example, the data schema 506 shown in FIG. 5. The derivation graph generation tool 600 produces as output a derivation graph 606. The derivation graph generation tool 600 includes a node generation tool 608 and an edge determination tool 610.

In some implementations, the derivation graph generation tool 600 may generate the derivation graph in two steps: in a first step, by generating a base derivation graph from the data schema 604 without reference to the tree of quads 602; and in a second step, by adding nodes and edges to the base derivation graph by processing the tree of quads 602 in a recursive manner to produce the derivation graph 606 for the data expression represented by the tree of quads 602. In some implementations, the first step may be performed in advance of the second step, for example, responsive to a change in an underlying database which causes a change in the data schema 604, and the resulting base derivation graph may be stored and reused in later generation of derivation graphs for various data expressions. In other words, the derivation relationships for a given data expression may be built on top of the base derivation graph. The base derivation graph represents the derivation relationships of datasets and columns in the underlying database represented by the data schema 604. In such implementations, the derivation graph generation tool 600 may not be provided the tree of quads 602 when the base derivation graph is pre-generated in the first step and steps relating to the tree of quads may be omitted. Likewise, in such implementations, when the derivation graph 606 for the tree of quads 602 is generated, the data schema 604 may be omitted as input, and the base derivation graph may be provided as input (as the starting derivation graph to which nodes and edges will be added) in the second step. In other implementations, the first step and second step may be performed consecutively or in inverse order.

The node generation tool 608 determine nodes to be added to the derivation graph. Each node represents a quad from either the tree of quads 602, a dataset or column from the data schema 604, or both (e.g., a dataset quad or column quad representing respectively a dataset or column in the data schema 604). The node generation tool 608 parses the tree of quads 602 to add nodes representing the quads of the tree of quads 602 to the derivation graph 606. For example, the node generation tool 608 may process the tree of quads 602 starting at a bottommost level of leaves until it arrives at a final, topmost leaf. The node generation tool 608, either prior to, after, or concurrently with the parsing of the tree of quads 602, parses the data schema 604 to add nodes representing quads from the data schema 604 to the derivation graph 606. The parsing of the data schema 604 may result in a derivation graph representative of all the datasets and columns in the data schema 604 or may be limited based on the datasets and columns corresponding to quads in the tree of quads 602. For example, the node generation tool 608 may first identify columns within the Transaction dataset as expressed in the data schema 604 and add nodes representing those columns to the derivation graph 606. The node generation tool 608 may then identify any foreign key relationships between those columns and columns in other datasets. If the size of the derivation graph is limited, the generation of nodes may, for example, be based at least in part on the datasets and columns associated with quads in the tree of quads 602.

After the nodes are added to the derivation graph 606 by the node generation tool 608, the edge determination tool 610 determines edges to add between sets of two of the nodes within the derivation graph 606 and adds them accordingly to the derivation graph 606. Accordingly, the edge determination tool 610 may recursively process quads of the tree of quads 602 to determine derivation relationships between the quads represented thereby and other quads represented by nodes then present in the derivation graph 606. The edge determination tool 610 may begin with the leaves at the lowest level of the tree of quads 602 and moves upwardly to determine and add edges to the derivation graph 606.

The edge determination tool 610 uses derivation rules defined for different types of quads (e.g., datasets, columns, unary or binary functions, etc.) evaluated against the data schema 604 to determine types of quads which are derivable therefrom and thus the edges which should be determined between those quads. For example, a derivation rule may indicate that quads corresponding to columns are capable of deriving quads corresponding to datasets which include those columns, that quads corresponding to binary operations between a first quad and a second quad are capable of deriving the first quad and the second quad, that quads corresponding to unary operations for a given quad are capable of deriving that given quad, that quads corresponding to slices are capable of deriving a sliced quad and dimensions of that quad indicating how the slicing is to be performed, and so on.

Different derivation rules may be defined as corresponding to different edge types. For example, a derivation rule indicating the derivability of a dataset quad from a column quad may be used to determine column edges between such quads. In another example, a derivation rule indicating that a dataset quad and some kind of incoming relationship for that dataset quad can derive a column quad having a foreign key to that dataset quad based on the incoming relationship may be used to determine relationship edges between such quads. In yet another example, other derivation rules may be used to determine algebraic edges between respective quads. As such, the edge determination tool 610 can determine edges to connect quads within the derivation graph 606 and add those edges to the derivation graph 606 accordingly using derivation rules corresponding to those quads.

Once the edge determination tool 610 has completed adding edges to the derivation graph 606, the derivation graph 606 is made available for querying, for example, using the derivation graph querying tool 514 shown in FIG. 5. In some implementations, some or all of the derivation graph 606 may be stored for use with a later query which re-uses the data expression from which the tree of quads 602 was produced.

The querying of the derivation graph 606 to generate a query may in some cases include deferring a join included in the data expression parsed to produce the tree of quads 602 pending the identification of a root node within the derivation graph 606. As has been described, two quads P and Q in which P derives Q can be joined by treating P as the so-called root of the join and joining Q into P. This means that the dimensions of P have enough information to produce the join keys (i.e., the foreign/primary key relationship edges used to chain nodes of the derivation graph together) to the dimensions of Q, while the reverse is not necessarily true. Thus, it is important when joining quads to determine the root node of the join and to construct the join keys from all the other quads to the root node. However, in some cases, there may be insufficient information available at a given time to determine the root node of a given join, such as where nodes representing two quads to be joined are not directly connected by an edge within the derivation graph 606. For example, a data expression or portion thereof may recite:

((Product.Promotion*User.Discount)*
Transaction.Amount)

which indicates to first join the quads Product.Promotion and User.Discount and thereafter to join the result of that join with Transaction.Amount. However, Product.Promotion and User.Discount correspond to two entirely unrelated datasets, and without the support of the Transaction.Amount quad, there is no clear join key for them. To avoid such cases, the decision of picking the root of the join, and thus identifying a root node to use for the join within the derivation graph 606, may be deferred using a DEFERRED_JOIN pseudo-relational operator. That operator will take a list of input relational operators and join them on some as-of-yet unfinalized join key. The dimensionality of that subject join is unknown until the precise join criteria (e.g., the root node) is later determined.

During recursive iterations of the derivation graph 606, and thus after the generation of the derivation graph 606, a check is performed against the nodes marked for deferred joining to determine whether enough information usable to determine a root node for the join exists yet. Deferred joins for which a root node can be determined may be resolved using derivability chains each from the respective nodes representing the quads to be joined to the root node. The determination of a root node for a join between two nodes to may thus be conditioned upon there being a unidirectional derivability chain between the root node and each of the two subject nodes.

Where it is determined during a check that a node marked as a deferred join is unable to be resolved after a final iteration through the derivation graph 606, the node remains unresolved at least for the time being. In the event of one or more unresolved nodes after the final iteration through the derivation graph 606 and thus at a final check, a determination is made that the derivation graph 606 is incapable of being queried to establish join relationships between quads of the underlying data expression. In such a case, this means that a query cannot be generated for that data expression, and so an error is reported to the user. For example, the user may evaluate the error message to rewrite some or all of the underlying data expression.

Figure 7:
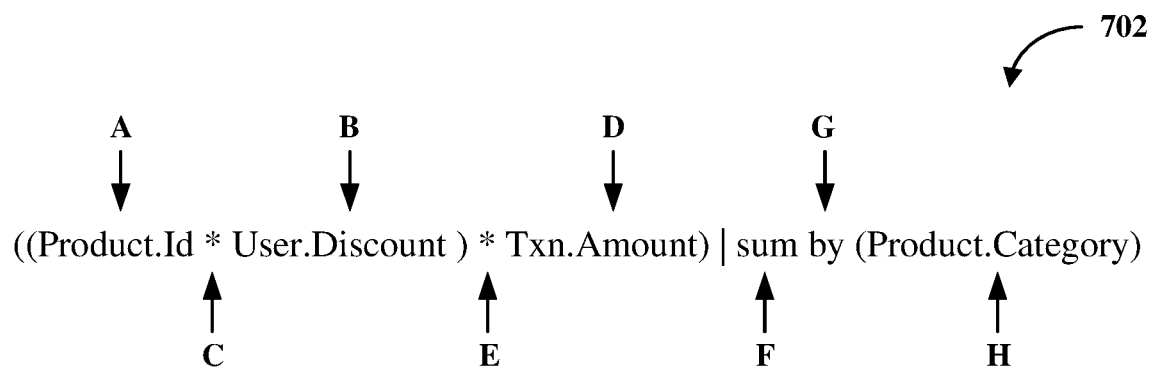
FIG. 7 is an illustration of an example of a tree of quads produced by parsing a data expression in a simplified query language.
Figure 7:
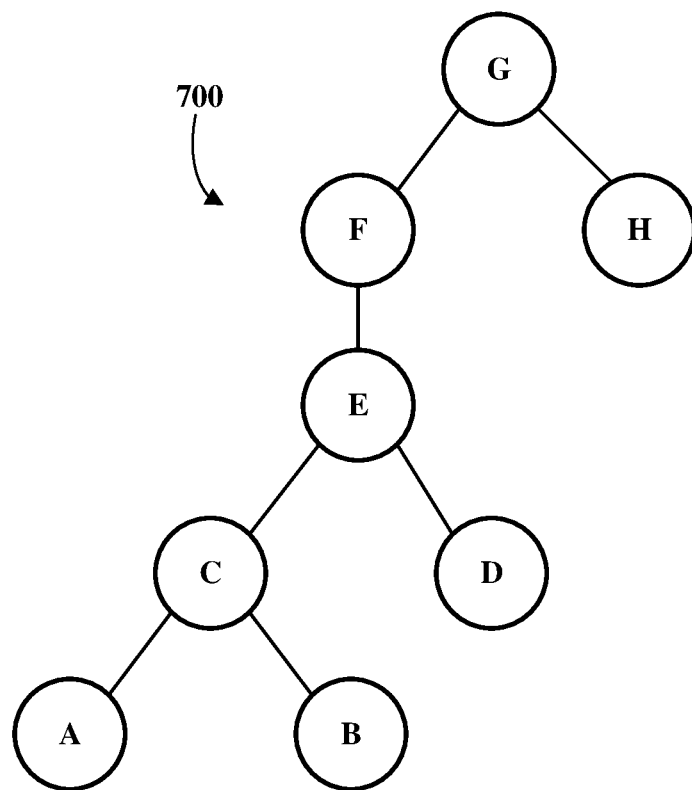

FIG. 7 is an illustration of an example of a tree of quads 700 produced by parsing a data expression 702 in a simplified query language, which may, for example, be the data expression 504 shown in FIG. 5. As shown, the data expression 702 includes eight quads labeled A through H, in which the quad A corresponds to the ID column in the Product dataset, the quad B corresponds to the Discount column in the User dataset, the quad C corresponds to the join of the quads A and B, the quad D corresponds to the column Amount in the Transaction dataset, the quad E corresponds to the join of the quads C and D, the quad F corresponds to an aggregation by summation of the quad E, the quad G corresponds to a slice for the aggregation of the quad F, and the quad H corresponds to a dimension by which to slice for the quad G.

The tree of quads 700 includes leaves representing each of the quads A through H according to a relational algebraic form of the data expression 702. The leaves representing the quads A and B appear at a lowest leaf level given that the quad C is a join on them. Because the quad E is a join of the quads C and D, the leaves representing the quads C and D appear at a next leaf level. The quad F operates against only the quad E, and so the next leaf level includes only the quad E. However, the quad G operates against both of the quad F and the quad H by defining the manner by which the aggregation of the quad F is sliced according to the quad H. Accordingly, the leaf level above the one with the leaf representing the quad E includes leaves representing the quads F and H, and the topmost leaf level includes only a leaf representing the quad G. As stated above, the arrangement of the tree of quads 700 is not based on derivation relationships between those quads, but rather then manner by which the quads are arranged within the data expression 702.

Figure 8:
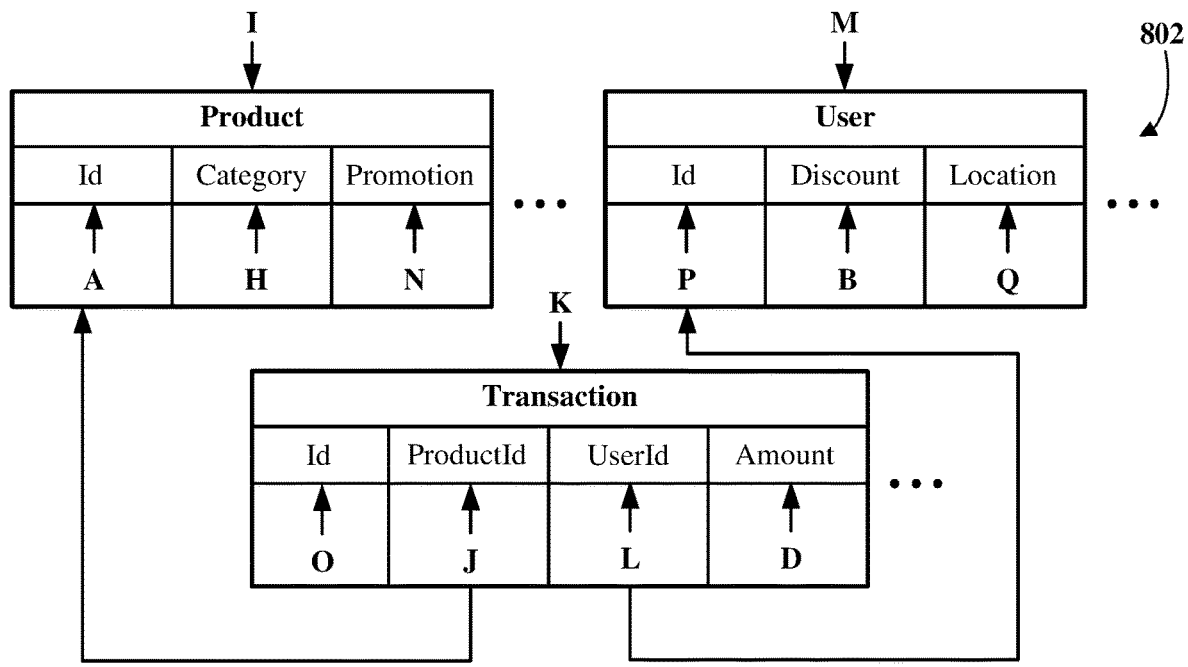
FIG. 8 is an illustration of an example of a portion of a derivation graph generated based on a tree of quads and a data schema.
Figure 8:
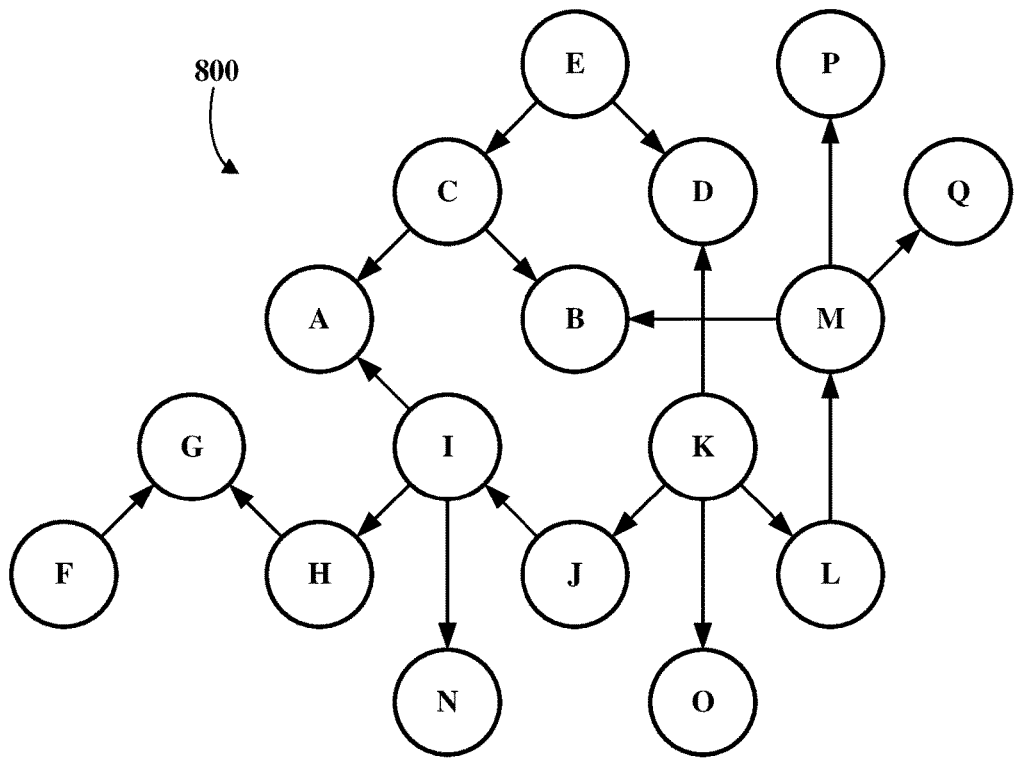

FIG. 8 is an illustration of an example of a portion of a derivation graph 800 generated based on the tree of quads 700 shown in FIG. 7 and a data schema 802, which may, for example, be the data schema 506 shown in FIG. 5. The data schema 802 shows three datasets, Product, Transaction, and User, which are respectively identified as the quads I, K, and M. The Product dataset includes in relevant part columns including Id, Category, and Promotion, in which Id and Category are respectively identified as the quads A and H in the tree of quads 700 and in which Promotion, which is not in the tree of quads 700, is identified as the quad N. The Transaction dataset includes in relevant part columns including Amount, which is identified as the quad D in the tree of quads 700, and Id, ProductId, and UserId, which are not in the tree of quads 700 and are respectively identified as the quads O, J, and L. The User dataset includes in relevant part columns including Discount, which is identified as the quad B in the tree of quads 700, and Id and Location, which are not in the tree of quads 700 and are respectively identified as the quads P and Q.

The derivation graph 800 as shown includes nodes for each of the quads A through Q in which some of those nodes are representative only of quads in the tree of quads 700, others of those nodes are representative of columns or datasets present only in the data schema 802, and others of the nodes are representative of columns or datasets present both in the data schema 802 and tree of quads 700. The arrows shown as connecting respective nodes are edges connecting those nodes in which the pointed-from node is the deriving quad and the pointed-to node is the derived quad. For example, the connection between the nodes B and M shows an arrow pointing from node B to node M. This is because columns derive datasets, and the quad B is a column of the quad M dataset. The type of edge represented by a given arrow within the derivation graph 800 can be inferred by the context of the connected nodes. For example, arrows which connect columns to datasets which include those columns are column edges, which include the arrows between the nodes A and I, B and M, D and K, H and I, J and K, L and K, N and I, O and K, P and M, and Q and M. In another example, arrows which connect columns having a foreign key/primary key relationship with another dataset are relationship edges, which include the arrows between the nodes J to I and L to M. In yet another example, arrows which connect schema objects with computed quads are algebraic edges, which include the arrows between the nodes C and A, C and B, E and C, E and D, F and G, and H and G.

In some implementations, column and relational edges and dataset and column nodes are generated in advance from the data schema and placed into a base derivation graph. Later, when a data expression is parsed into a tree of quads, the tree of quads are processed to add additional nodes and algebraic edges to the derivation graph.

Figure 9:
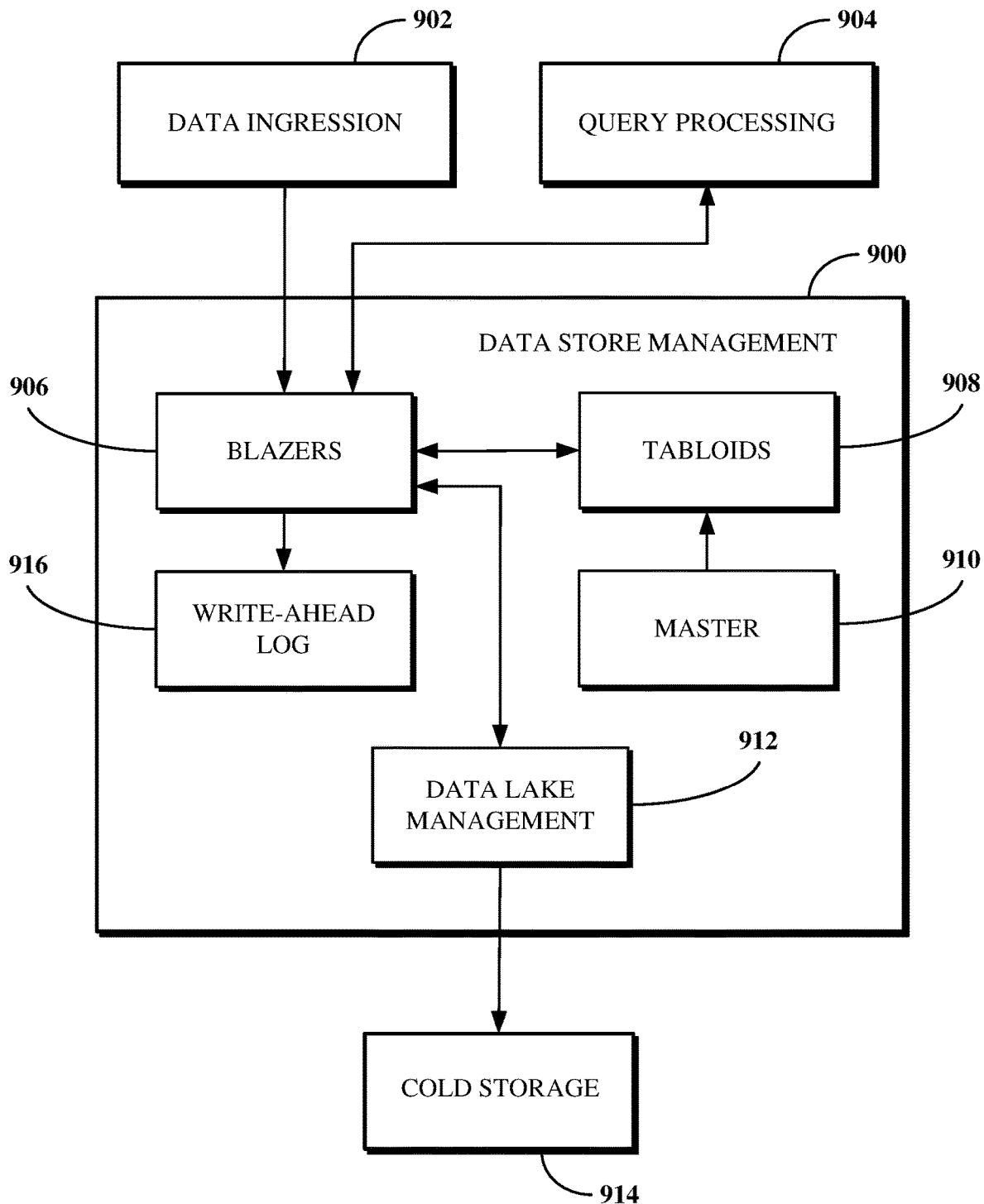
FIG. 9 is a block diagram of an example of a data store management component of a data platform.

FIG. 9 is a block diagram of an example of a data store management component 900 of a data platform. For example, the data store management component 900 may be the data store management component 304 of the data platform 300 shown in FIG. 3. The data store management component 900 ingests data obtained using a data ingression component 902, which may, for example, be the data ingression component 302 shown in FIG. 3, to prepare the data for storage. Once the ingested data is available in storage, it can be accessed for query execution, such as by a query processing component 904, which may, for example, be the query processing component 308 shown in FIG. 3.

Data obtained from the data ingression component 902 are stored in tables using blazers 906 and tabloids 908. Blazers 906 are server nodes (e.g., database server nodes) arranged in clusters and which perform computations against data stored within tables. Tabloids 908 are server nodes that maintain the tables and coordinate operations performed by blazers 906 of a cluster. A master 910 is a highest level controller entity in a cluster and schedules shards of tables maintained by a tabloid 908 of a given cluster across available blazers 906 of that cluster. The mapping of tables to tabloids 908 is periodically computed and published by the master 910 in a directory. The directory is used to direct data obtained from the data ingression component 902 to the appropriate table. A cluster may have one master 910, one or more tabloids 908 and one or more blazers 906. For example, a cluster may have multiple tabloids 908 and blazers 906.

A table maintained by a tabloid 908 includes one or more shards. The organization of shards for a table may be random, such as in which rows of the table are randomly mapped to various shards, or semantic, such as where a given row is mapped to a specific shard using a sharding function. Each shard includes one or more pages, which may be fixed-size collections of rows within a shard. For example, a page may be sized to include one million or more rows. Each page includes one or more columns of data which may be independently stored and retrieved. The data is stored in blocks, which are atomic storage units for columns. In that schemas may change over time, a table maintained by a tabloid 908 may also be associated with a version which represents a specific schema of the table.

The blazers 906 of a cluster ingest, such as by writing and updating, table data into a data lake managed using a data lake management component 514. The data lake is a storage repository that maintains the data as ingested within one of three tiers of storage, including a first tier corresponding to local memory at a blazer 906 (e.g., a memory buffer of a device implementing a blazer 906), a second tier corresponding to warm storage at a blazer 906 (e.g., a local hard drive, for example, a solid state drive, of a device implementing a blazer 906), and a third tier corresponding to a cold storage 914 (e.g., a cloud server storage or a local server drive accessible by a blazer 906). Data is moved between the tiers of storage in a manner designed to provide high availability and low latency access by the query processing component 904. In some implementations, the data lake and/or the data lake management component 912 may be implemented using an immutable distributed transaction ledger system, such as BlockDB. The data lake management component 514 may use a cache prioritization scheme to manage data storage across one or more of the tiers of storage based on queries executed by the query processing component 904. For example, data may be moved into memory at a device implementing a blazer 906 based on a recency of use of the data for query execution and/or based on a frequency of use of that data for query execution over some period of time. Prioritized datasets may be maintained within local memory whereas datasets which have either not been recently used which are infrequently used within some period of time may be maintained within warm storage at a blazer 906 or the cold storage 914.

Mutations to a table maintained by a tabloid 908, such as by the ingestion of data or other operations performed by a blazer 906, are marked with sequence numbers. A row added to a table based on a mutation (e.g., a data manipulation language (DML) operation or transaction) may be annotated with the sequence number of that mutation. In some implementations, a row may be immutable once it is written to a table. Different sequence numbers may be used to indicate different mutations. For example, a begin sequence number (BSN) may be annotated to a table row for insert mutations, an end sequence number (ESN) may be annotated to the row for delete mutations, and updates may be supported based on a combination of a BSN and ESN. A query executed by the query processing component 904 is processed against a live sequence number (LSN) of a table maintained by a tabloid 908. A LSN refers to the sequence number annotated to a last row of the table and therefore is the sequence number for the most current version of the table. Given that tables may constantly be updating as new data is obtained from the data ingression component 902, the LSN which is used to serve data for query execution is greater than or equal to a latest BSN for the table and also less than an ESN for the table.

The tabloids 908 coordinate table-level workflows (e.g., resharding, compacting, and transactions) serve salient information about maintained tables (e.g., schema, shard information, metadata, and LSNs) for use by other aspects of the data store management component 900 and/or the query processing component 904. The tabloids 908 orchestrate the application of DML operation mutations that impact multiple shards of a table. Non-transactional operations that are specific to a given shard are directly forwarded to the blazer 906 associated with that shard according to a mapping defined within the directory published by the master 910. The tabloid 908 which forwards an operation to a blazer 906 allocates a sequence number to be applied by the blazer 906 to the row affected by the operation. For example, the blazer 906 may request the sequence number from the tabloid 908. The blazer 906 persists the operation to a write-ahead log 916 for durability. The write-ahead log 916 maintains records of operations performed by the blazers 906 on a per-shard basis to enable the blazers 906 to recreate their in-memory states in the event of a planned event or crash which temporarily restricts operation by the data store management component 900. In some implementations, the write-ahead log 916 may be implemented using a software bus, such as Apache Kafka®.

The processes performed by the data store management component 900 in response to or otherwise as part of a query execution process performed by the query processing component 904 may differ between DML operations performed by a single blazer 906 and transactions atomically applied across multiple blazers 906. For DML operations, an incoming DML operation is received at a blazer 906 and written into the write-ahead log 916. The blazer 906 requests a sequence number for the DML operation from a tabloid 908 which maintains the subject table. Data necessary to process the DML operation is loaded into memory, or is determined to already be in memory, at the device implementing the blazer 906 to prepare the blazer 906 for query processing. The blazer 906 applies the sequence number requested and obtained from the tabloid 908 to the DML operation and transmits an update indicating the application of that sequence number to the tabloid 908. The tabloid 908 updates the LSN for the subject table based on the application of the sequence number by the blazer 906. The data to use for the DML operation is now available. For transactions, an incoming transaction is received at a tabloid 908 and written into the write-ahead log 916. The tabloid 908 assigns a sequence number to the transaction. Data necessary to process the transaction is loaded into memory, or is determined to already be in memory, at devices implementing the blazers 906 which are mapped to shards within the subject table. Those blazers 906 apply the sequence number to their shards and transmit and update indicating the application thereof to the tabloid 908. The tabloid 908 updates the LSN for the subject table based on the application of the sequence number by the blazers 906. The data to use for the transaction is now available.

The data store management component 900 supports recovery processes for restarting blazers 906 and tabloids 908. For blazers 906, where there are no backup replicas available for a shard mapped to a blazer 906, the entire in-memory state of a blazer is recomputed. While this occurs, the blazer 906 may still receive operations to process, but will not execute them prior to catching up to the state of the shard corresponding to the LSN at the time of the restart without risking returning incomplete data being served for query execution. To recover accepted changes to a shard after a blazer 906 restarts, the tabloid 908 which maintains the subject table provides a recovery target to the blazer 906 by embedding a maximum sequence number for every shard. Alternatively, the blazer 906 may track the maximum sequence number that can be serviced by the shard, in which case the blazer 906 gets the definition of assigned shards from the tabloid 908 and updates the maximum sequence number accordingly, at which point the blazer 906 can serve data for rows having a sequence number which is less than the maximum sequence number. For tabloids 908, the process used to restart a tabloid 908 is important given that LSNs for individual tables maintained by the tabloid 908 are not maintained anywhere other than in memory at the tabloid 908. To prevent re-use of an already applied LSN, the restart process for the tabloid 908 includes updating the LSN for a table to a sequence number beyond a maximum sequence number that has been durably used by a DML operation. The recovery workflow described above for blazers 906 is then triggered to allow the tabloid 506 to wait for the blazer 508 to catch up to that value.

In some implementations, rather than writing all rows of a batch of transaction insert operations into the write-ahead log 916, the batch may be packaged into a file for storage in the cold storage 914 and the name of the file may instead be recorded into the write-ahead log 916. The file may be keyed by the sequence number of the mutation and can be garbage collected once the sequence number has been pruned from the write-ahead log 916. Recording the name of the file rather than each of the rows of the batch insert reduces timing and bandwidth overheads and avoids write failures which may otherwise result from processing a transaction in chunks.

In some implementations, a recovery process performed by or for the data store management component 900 using the write-ahead log 916 may use data written to the cold storage 914. For example, and because data blocks are typically immutable once written, a given sequence number can be removed from the write-ahead log 916 once all of the blocks associated with it have been moved to storage. The tail of the write-ahead log 916 may then be pruned up to that sequence number. As such, during recovery, all blocks associated with sequence numbers which are less than or equal to a given sequence number may be read and then mutations with sequence numbers greater than that given sequence number may be applied against those blocks.

The data store management component 900 predicts the use by the query processing component 904 of certain datasets using recency information indicating how recently those datasets have been used for query execution by the query processing component. Data is made available by the data store management component 900 to the query processing component 904 with the lowest latency when that data is in a memory buffer (e.g., of a blazer 906) rather than a warm storage device (e.g., a local storage of a blazer 906) or the cold storage 914. However, a memory buffer has a finite size and therefore cannot store all data at all times. As will be described below, the data store management component 900 communicates with the query processing component 904 (e.g., based on both being included in a same data platform, such as the data platform 300) to determine what data to purge from a low-latency memory buffer based on recency information indicating how recently a given dataset has been used for query execution. Accordingly, the data store management component 900 is configured to purge ingested data from a memory buffer by moving it into a warm storage device, such as local storage at a blazer 906, or into the cold storage 914, based on recency information for the data. For example, the purging can include moving a dataset into warm storage based on recency information for the dataset indicating that the data has not been used within a first temporal threshold. In another example, the purging can include moving the dataset into the cold storage 914 based on the recency information indicating that the data has not been used within a second temporal threshold greater than the first temporal threshold. Aside from predicting the use of certain datasets, the data store management component 900 may also move data from warm storage or from the cold storage 914 into a low-latency memory buffer for use by the query processing component in response to a request for that data from a compute node of a query execution pipeline implemented using the query processing component 904.

Figure 10:
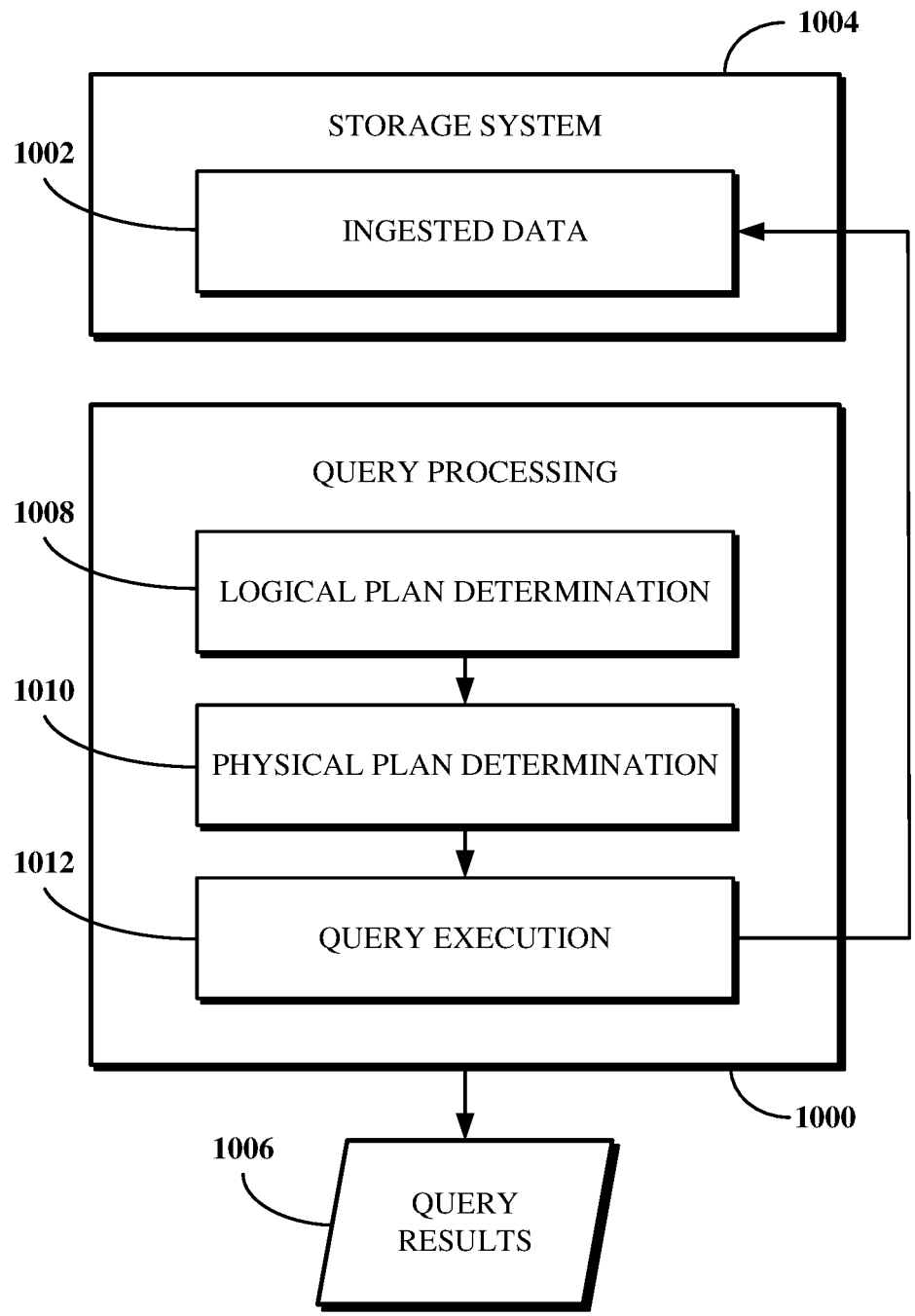
FIG. 10 is a block diagram of an example of a query processor component of a data platform.

FIG. 10 is a block diagram of an example of a query processor component 600 of a data platform. For example, the query processor component 600 may be the query processor component 308 of the data platform 300 shown in FIG. 3. The query processor component 600 uses a query execution pipeline to access ingested data 1002 within a storage system 1004. The ingested data 1002 is data which was prepared for use by a data store management component, which may, for example, be the data store management component 900 shown in FIG. 9. Query results 1006 produced by the query execution may then be stored, used for analytical monitoring, or otherwise further processed or used.

The query processing component 1000 includes a logical plan determination component 1008, a physical plan determination component 1010, and a query execution component 1012. The logical plan determination component 1008 processes a query (e.g., the query 502 generated by the query generation component 500 shown in FIG. 5 or a query otherwise obtained by the query processing component 1000) to determine a logical plan for executing the query. The physical plan determination component 1010 processes the logical plan determined by the logical plan determination component 1008 to determine a physical plan for executing the query. The query execution component 1012 instantiates compute nodes (e.g., server nodes, such as application server nodes) according to the physical plan and executes the query by processing the ingested data 1002 using those compute nodes to produce the query results 1006.

The logical plan is a tree of relational operations that describes the computations required for the query to be executed. The logical plan determination component 1008 determines the logical plan for executing the query by parsing the query and converting the expressions thereof into the tree of relational operations in a relational algebraic form. The tree of relational operations identifies faucets and turbines to use to execute the query at different levels of a query execution pipeline. A faucet is a temporary holding point for data. A turbine performs some part of the computation for query execution. Faucets and turbines are arranged on alternating levels of the query execution pipeline. A first level includes one or more source faucets which obtains a memory pointer usable to access the data to be processed for query execution within one or more blazers of a data store management component (e.g., the blazers 906 of the data store management component 900 shown in FIG. 9). For example, the memory pointer may be obtained using a memory mapping function such as mmap. A level below the one or more source faucets includes one or more turbines assigned to compute operations as part of the query execution which access the data using the memory pointer transmitted to them by the one or more source faucets. The next level includes another one or more faucets, which may be one or more final faucets that output the query results 1006 where there are no further downstream turbines, or one or more downstream faucets that obtain local results from the first turbine level and passes those results to a next downstream turbine level, thereby decoupling those upstream and downstream turbines. In either case, the final level of the query execution pipeline includes one or more final faucets. The tree of relational operations describes the computations required to execute the query at various levels as well as the turbines which will be used to perform those computations. In some example, a logical plan may be a Jsonnet expression which can be compiled down to JSON-encoded protocol buffers.

The particular number of turbines or faucets in a given level and the number of turbine and faucet levels in the query execution plan are thus based on the logical plan. The logical plan determination component 612 determines the physical plan for the query based on one or more of the datasets to be used for the query, the amount of data from those datasets to be processed for the query execution, and the types of operations (e.g., joins, aggregations, etc.) to be performed as part of the query execution. For example, the logical plan determination component 612 may use properties of tables maintained by the data store management component (e.g., schema, sharding data, and LSNs) to determine the turbines and faucets of a query execution pipeline. In some cases, the logical plan determination component 612 may translate splits enumerated for a table to determine assignments for the logical plan.

For example, for a query including a global aggregation operation involving a single, large dataset, the physical plan may indicate to instantiate a single source faucet to deliver a memory pointer for accessing the dataset, multiple turbines in a next level which will each be assigned and retrieve a portion of the dataset, a single downstream faucet that collects the local results from those multiple turbines, a single downstream turbine in the next level below the downstream faucet that performs a merge operation to aggregate the local results, and a single final faucet in the last level.

In another example, for a query including a grouped aggregation operation in which a single, large dataset is aggregated based on some grouping, the physical plan is similar to that described above for the global aggregation operation where the cardinality of the grouping is small; however, where the cardinality of the grouping is instead large, multiple turbines may be present in the second turbine level to improve the parallel processing efficacy of the query execution turbine at the merge stage.

In yet another example, for a query including a pre-sharded grouping operation (a sub-class of a grouped aggregation operation in which a dataset is physically sharded on a subset of the grouping key and the physical sharding refers specified a layout of the various pieces of the bounded or unbounded collection of data of the dataset within a physical node cluster), records for a group are limited to reside in a single physical shard such that each shard can be locally grouped without a final merge step as described in the above global and grouped aggregation examples. Multiple source faucets are used to deliver portions of the physically sharded data to certain of multiple turbines, with the caveat that the accuracy of results produced using this query execution pipeline is based on those source faucets pushing data to their respective turbines only from a single corresponding physical shard of the dataset. The final level thus includes a same number of faucets as the first level.

Other examples of operations which may be processed by a query execution pipeline including nodes instantiated based on a physical plan for a query include, but are not limited to, windowed grouping operations and grouped aggregation operations with joins, such as replicated (e.g., unbounded-bounded) join operations, co-sharded join operations, distributed join operations, outer join operations, join operations with changing dimension tables, and unbounded-unbounded join operations.

The physical plan includes a network of compute nodes to be instantiated as the faucets and turbines within the query execution pipeline. The physical plan determination component 1010 determines the physical plan for the query execution based on the logical plan determined by the logical plan determination component 1008. Determining the physical plan includes identifying compute nodes to instantiate as the turbines and faucets identified within the logical plan. The network of compute nodes instantiated based on a physical plan determined by the physical plan determination component 1010 is scalable based on the specific computational requirements for a query as set forth in its logical plan. A compute node identified for instantiating a faucet or turbine according to the physical plan may be a device or virtual machine which implements a blazer that stores the ingested data 1002 or another device or virtual machine. In some implementations, the logical plan determination component 1008 and the physical plan determination component 1010 may be combined into a single component.

The query execution component 1012 instantiates the faucets and turbines of the logical plan determined by the logical plan determination component 1008 on compute nodes determined by the physical plan determination component 1010 and performs query execution against the query associated with the physical plan using those faucets and turbines. A source faucet of the query execution pipeline is given a mapping to a memory location within the storage system 1004 at which data to use for the query execution can be retrieved. The source faucet also generates a watermark to use for the query execution. The watermark is an element that indicates a measure of progress of the query execution pipeline in processing the data for the query. For example, the watermark may be a binary value, an integer value, or a float value. Turbines use the watermark to determine how much of the data they have processed. The watermark is transmitted from the source faucet to each downstream turbine and faucet on a level-by-level basis based on the completion of data collection or processing at a given node. The completion of the results received by a final faucet at a final level of the query execution pipeline, and thus the outputting of the query results 1006, may be determined based on the watermark being received by that final faucet.

The specific processing of data by and transmission of watermarks between nodes of a query execution pipeline may differ in some ways based on whether the query to be executed by the query execution component 1012 is a batch query or a streaming query. For batch query execution, the faucets and turbines are instantiated according to the physical plan. A source faucet binds a LSN for the subject dataset from the tabloid which maintains the table storing the dataset to determine the data associated with that LSN (e.g., the ingested data 1002 or data including the ingested data 1002). The source faucet is given a pointer to a location in a memory buffer (e.g., of a blazer) at which data of that dataset according to the LSN can be retrieved. The source faucet also generates a watermark, which may, for example, be a binary variable or an integer value. The source faucet transmits the pointer and the watermark to each turbine in the next level of the query execution pipeline. For example, the source faucet may transmit a copy of the watermark to each turbine. Each of the turbines retrieves a portion of the data using the memory pointer and performs some computation on the data portion based on the logical and physical plans. Each of the turbines transmits is computed data and the watermark (e.g., the copy it received) to a downstream faucet. Where the downstream faucet is the final faucet, the downstream faucet waits until it has received the watermark (and thus the computed data) from each turbine before outputting the final results as the query results 1006. Alternatively, where the downstream faucet is not the final faucet, the downstream faucet may in some cases transmit computed data received from an upstream turbine to one or more downstream turbines at a next level of the query execution pipeline, but waits to transmit the watermark to those downstream turbines until after it has received the watermark from each of the upstream turbines. This is because the transmission of the watermark from an upstream turbine indicates that the turbine has finished processing the data it obtained and thus that no further results will be obtained from that turbine. Each turbine may finish its computations simultaneously or at different times. The downstream faucet enumerates the upstream turbines and thus knows how many turbines are expected to transmit data and watermarks. The downstream faucet eventually receives the watermark from each upstream turbine and transmits the watermark (e.g., copies thereof) to each downstream turbine along with any local results from the upstream turbines not yet provided to the downstream turbines. The downstream turbines operates as the upstream turbines by computing the data and transmitting the computed data and the watermark they obtained to a further downstream faucet. The process concludes once the final faucet receives the watermark from each turbine at the level above it, at which point the query results 1006 are output and the faucets and turbines are terminated.

For streaming query execution, the process is largely similar, except that it repeats on some time interval basis based on newly ingested data, and the watermarks are used to indicate the completion of a partial result set corresponding to a certain time interval of data. A source faucet binds a LSN corresponding to a specific time interval for the subject dataset from the tabloid which maintains the table storing the dataset to determine the data associated with that LSN (e.g., the ingested data 1002 or data including the ingested data 1002). The source faucet is given a pointer to a location in a memory buffer (e.g., of a blazer) at which data of that dataset according to the LSN can be retrieved. The source faucet generates a watermark which may, for example, have a value mapped to the specified time interval corresponding to the LSN. The watermark and data are then processed between the levels of the query execution pipeline as described above to ultimately obtain a final result for that specified time interval. For example, the transmission of a watermark from a faucet to a turbine may indicate to that turbine that no further data will be used for the specified time interval. The final results are aggregated against pre-existing results from earlier time intervals. The source faucet then binds a new LSN corresponding to a next time interval for the subject dataset and generates a new watermark which may, for example, have a value mapped to that next time interval. The process repeats until the faucets and turbines are terminated.

As described above, a turbine may generally process data as soon as it receives it from an upstream faucet. However, in some cases, a turbine may wait to process data until after the watermark has been transmitted from all upstream turbines and faucets. For example, in the case of a replicated join performed against two datasets in which a first source faucet transmits a memory pointer for a first, unbounded dataset and a first watermark and a second source faucet transmits a memory pointer for a second, bounded dataset and a second watermark, a first level of turbines immediately downstream from the source faucets may access the respective data for join and local grouping processing. However, the packets from the first dataset may in at least some cases only be processed by a turbine of that first level once the watermark from the second source faucet has been received by that turbine. This is because the turbine only needs some of the data from the first dataset due to it being unbounded but needs all of the data from the second dataset due to it being bounded, and thus the receipt of the watermark indicates that the hash-table now fully reflects the contents of the second dataset as of some LSN for the subject table.

Similarly, a downstream faucet may generally transmit local results from upstream turbines to downstream turbines as soon as the local results become available to it. However, in some cases, a downstream faucet may wait to transmit local results from upstream turbines to downstream turbines. For example, in the context of a streaming query execution, data for a current time interval may still be under compute by one or more turbines while or after a source faucet binds a new LSN for data corresponding to a next time interval. In such a case, a downstream faucet may delay transmission of local results received from upstream turbines for that next time interval corresponding to the new LSN to its downstream turbines until those downstream turbines have completed processing of the data for the current time interval.

In some implementations, rather than transmitting a memory pointer to turbines, a source faucet may use a memory pointer to retrieve data from a blazer and thereafter transmit the retrieved data to the turbines in the next level of the query execution plan. In such a case, the turbines receive the watermark from the source faucet based on the turbines having received all of the data necessary for computation thereat from the source faucet.

Figure 11:
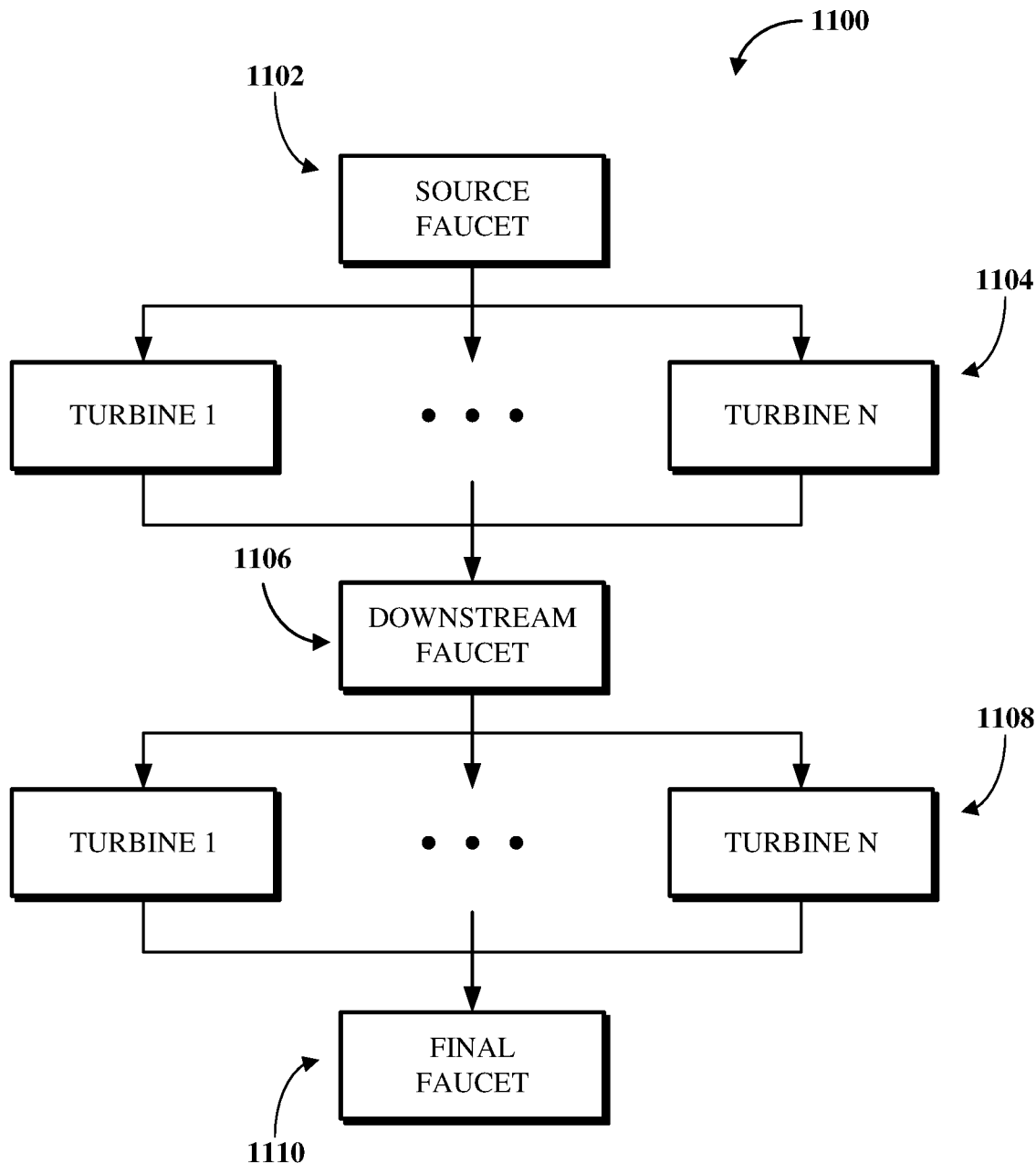
FIG. 11 is a block diagram of an example of a query execution pipeline.

FIG. 11 is a block diagram of an example of a query execution pipeline 1100, which includes faucets and turbines instantiated based on a physical plan determined, for example, by the physical plan determination component 1010 shown in FIG. 10. As shown, a first level 1102 of the query execution pipeline 1100 includes a single source faucet which has a pointer to a location in a memory buffer at which data usable to execute a query can be retrieved and which generates or otherwise obtains a watermark. A second level 1104 of the query execution pipeline 1100 includes one or more turbines (labeled as turbines 1 through N in which N is an integer greater than or equal to 1) that receive the watermark and the pointer from the source faucet and which access the memory buffer at the location identified by the pointer to retrieve and perform some computation against at least a portion of the data. A third level 1106 of the query execution pipeline 1100 includes one downstream faucet to which receives the watermark and local results computed by the turbines of the second level 1104 from each of those turbines. A fourth level 1108 of the query execution pipeline 1100 includes one or more turbines (labeled as turbines 1 through N in which N is an integer greater than or equal to 1) that receive the local results and the watermark from the downstream faucet of the third level 1106 and perform some computation against the local results. A fifth level 1110 of the query execution pipeline 1100 includes a final faucet that receives the local results and watermark from each of the turbines of the fourth level 1108 and outputs those local results as query results (e.g., the query results 1006 shown in FIG. 10). Although two levels of turbines and one level of downstream faucets are shown, other numbers or arrangements of levels may be used with the query execution pipeline 1100.

Figure 12:
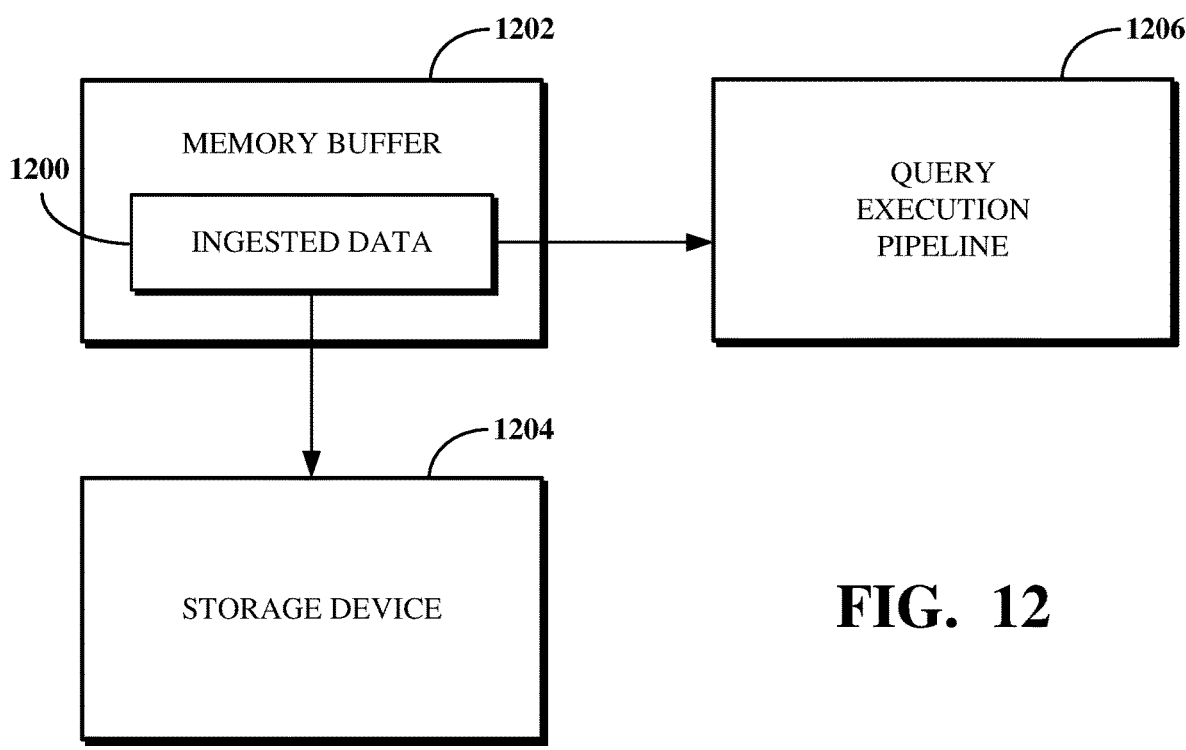
FIG. 12 is a block diagram of an example of parallel processing of ingested data for query processing and storage.
Figure 13:
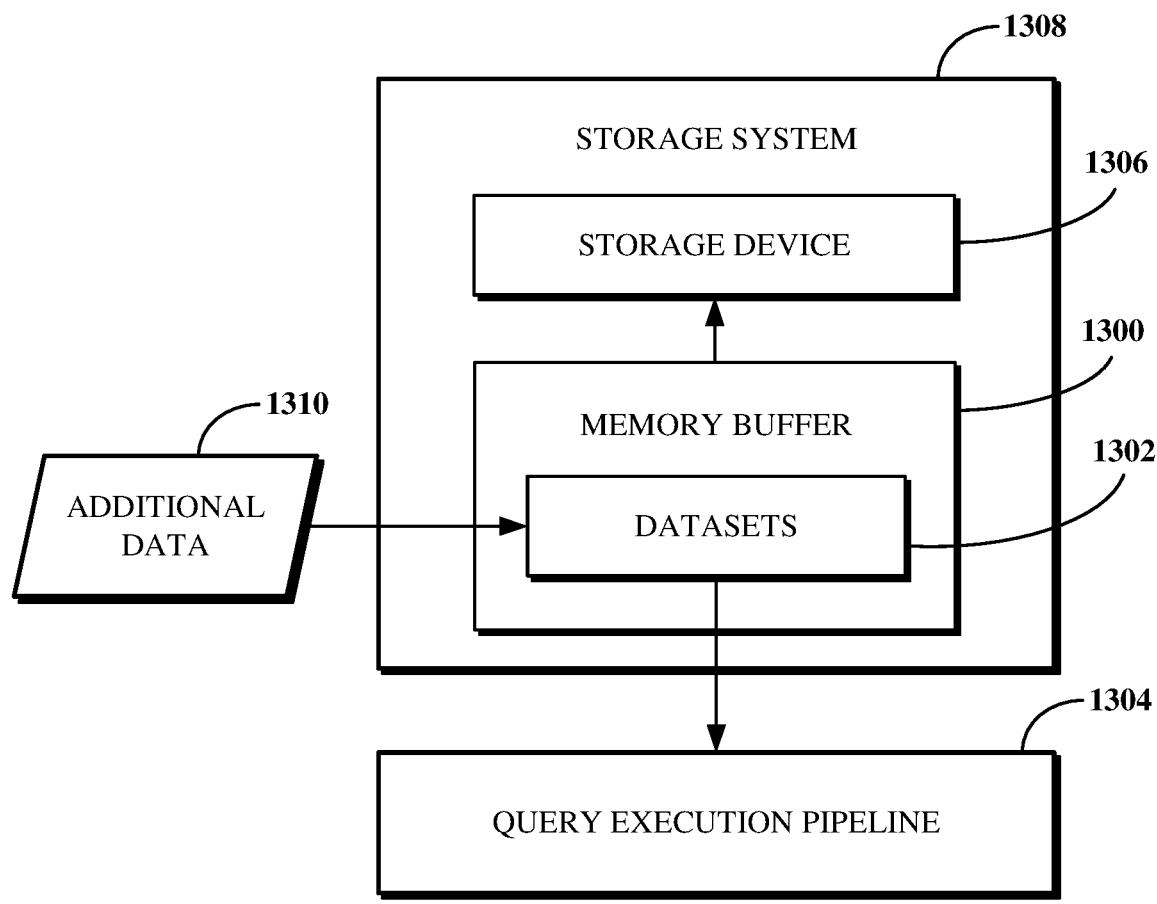
FIG. 13 is a block diagram of an example of buffer storage of static datasets for query operation optimization.
Figure 14:
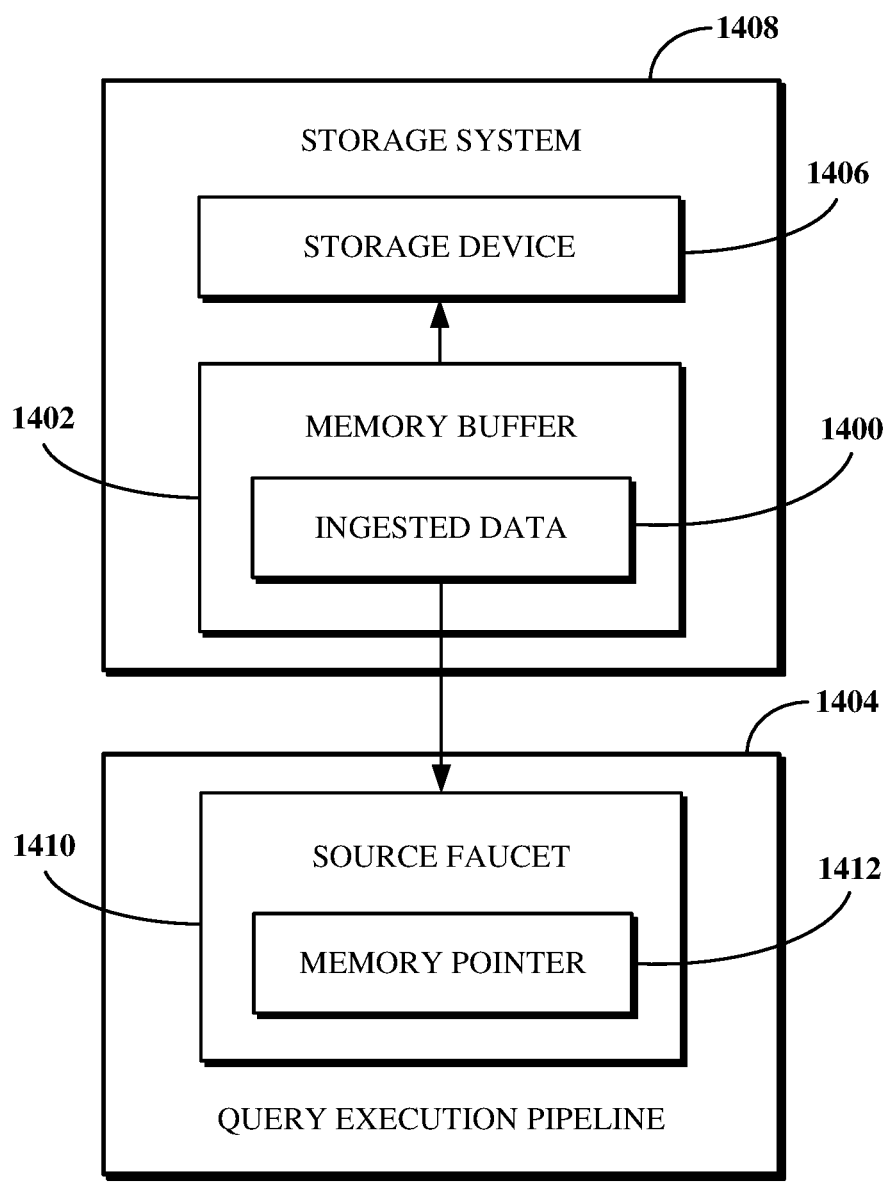
FIG. 14 is a block diagram of an example of access to ingested data within a memory buffer for query execution.

FIGS. 12-14 are block diagrams which illustrate low-latency capabilities of a data platform, for example, the data platform 300 shown in FIG. 3. The in-memory state of data obtained by a data store management component of a software platform, for example, the data store management component 900 shown in FIG. 9, enables low-latency access to that data by a query execution pipeline which includes compute nodes for executing a query, for example, the query execution pipeline 1100 shown in FIG. 11. This low-latency access reduces latencies otherwise introduced by the data ingestion process, making data available more quickly for query execution and thus for analytical monitoring and alerting. The low-latency access further optimizes certain operations performed as part of a query execution process, such as joins between datasets, based on in-memory storage of certain data involved in the joins.

FIG. 12 is a block diagram of an example of parallel processing of ingested data 1200 for query processing and storage. The ingested data 1200 is data which has recently been obtained at and at least partially ingested by a data store management component, such as the data store management component 900. The ingested data 1200 is in a memory buffer 1202, which may, for example, be a memory buffer of a blazer of the data store management component, prior to the writing of the ingested data 1200 to a storage device 1204, such as the cold storage 914 shown in FIG. 9. The ingested data 1200 is made available to a query execution pipeline 1206, such as a query execution pipeline used by the query processing component 1000 shown in FIG. 10, while the ingested data 1200 remains in the memory buffer 1202 and without requiring creation of a copy of the ingested data 1200. As such, data processing, analytical alerts, and the like which are based on query results output from the query execution pipeline 1206 based on the ingested data 1200 are not contingent upon the ingested data 1200 first being written to the storage device 1204. Rather, the ingested data 1200 may either be written to the storage device 1204 after or in parallel with the retrieval of the ingested data 1200 by a compute node of the query execution pipeline 1206. In some implementations, a daemon service of a storage system which stores data for use by the query execution pipeline 1206 may be co-located with the query processing component 806 and provide ingested data to the query processing component 806 without requiring a copy of that ingested data to first be made.

FIG. 13 is a block diagram of an example of buffer storage of static datasets for query operation optimization. Query operation optimizations are realized by the storage of a static dataset in a memory buffer 1300, which may, for example, be the memory buffer 1202 shown in FIG. 12. In particular, data of datasets which are determined to be static datasets may be maintained in the memory buffer 1300 while data of datasets determined to not be static datasets may be purged from the memory buffer 1300 to a warm or cold storage. A static dataset generally is a dataset which either does not change, is subject to infrequent change, or is less likely to change as compared to other datasets being joined with the static dataset. A dataset may be determined to be a static dataset based on one or more characteristics, including the dataset being a dimensional table, the dataset being determined to be less likely to change than another dataset, or the dataset having fewer records of data than another dataset.

As shown, the memory buffer 1300 stores datasets 1302 including data corresponding to the static dataset as a first dataset and data corresponding to a second dataset. The memory buffer 1300 is a low-latency buffer used for low-latency access to and processing of the stored datasets 1302. A query, for example, the query 502 shown in FIG. 5, may be executed using a query execution pipeline 1304, which may, for example, be the query execution pipeline 1206 shown in FIG. 12. The query includes a join operation between the first dataset and the second dataset stored in the memory buffer 1300. Executing the query thus includes producing output (e.g., the query results 1006 shown in FIG. 10) using the datasets 1302 stored in the memory buffer 1300.

Following execution of the query, data corresponding to the first dataset is maintained in the memory buffer 1300 and data corresponding to the second dataset is purged from the memory buffer 1300 based on a determination that the first dataset is a static dataset and a determination that the second dataset is not a static dataset. In particular, the second dataset is moved out of the memory buffer 1300 to a storage device 1306 of a storage system 1308 which includes the memory buffer 1300. For example, the storage device 1306 may be a non-volatile storage device, such as the storage device 1204 shown in FIG. 12. The storage system 1308, which may, for example, be the storage system 1004 shown in FIG. 10, is a tiered system of storage units managed by the data store management component, such as described with respect to FIG. 5 as including a first tier (e.g., memory buffers), a second tier (e.g., warm storage), and a third tier (e.g., cold storage). For example, the storage device 1306 may be a storage device of the second tier or of the third tier.

Various query operation optimizations are possible using a static dataset maintained in the memory buffer 1300. The query operation optimizations refer to operations performable by executing one or more queries against data including the static dataset while it is in the memory buffer 1300. Examples of such operations include, without limitation, incremental joins computed by re-executing a previously executed query against the static dataset and additional data obtained after the earlier execution of the query, joins other than incremental joins computed by combining output from a previous query execution and output from the execution of the same or a different query against a different dataset, and aggregations computed by executing the same or a different query against the static dataset.

Incremental join optimizations refer to the use of the static dataset in the memory buffer 1300 to compute an incremental join between that static dataset and additional data 1310 corresponding to the dataset which was purged from the memory buffer 1300. Because the earlier execution of the query computed a join between the two datasets and because only one of those datasets has changed as a result of the additional data 1310, a full join does not need to be re-computed based on the additional data 1310. Rather, an incremental join can be performed against the static dataset and the additional data 1310 and the results of that incremental join can be aggregated with the results of the join computed by the earlier execution of the query. Such incremental join optimizations are enabled by a data store management component which controls the storage of datasets between the storage system 1308, for example, the data store management component 900 shown in FIG. 9, having visibility into the data used by a query processing component which uses the query execution pipeline 1304. For example, the inclusion of the data store management component and the query processing component within the same data platform may enable the incremental join optimizations.

In some cases, however, additional data corresponding to the static dataset may be obtained. In such a case, the full join between the static dataset and the other dataset may be re-computed, such as due to the change to the static dataset and the other dataset not being in the memory buffer 1300.

In some implementations, after the earlier execution of the query to compute the join between the datasets, the query may be rewritten in some way to use pre-computed join indices. For example, the pre-computed join indices may refer to join results obtained from the earlier execution of the query. The inclusion of pre-computed join indices may improve join operations to be re-computed during subsequent executions of the query, such as by limiting resource expenditure and latency otherwise involved in re-computing the join indices.

Join optimizations other than those for incremental joins refer to the use of the static dataset in the memory buffer 1300 and another dataset. In particular, whereas an incremental join is computed for a first dataset as a static dataset and additional data obtained for a second dataset as a non-static dataset, other joins may be computed for the first dataset and a third dataset regardless of whether additional data for the third dataset has been obtained since an earlier execution of a query against the first dataset. Aggregation optimizations refer to the use of output previously computed by executing a query against the static dataset in the memory buffer 1300 and the use of further output computed by re-executing the same query or a different query against the static dataset.

FIG. 14 is a block diagram of an example of access to ingested data 1400 within a memory buffer 1402 for query execution. For example, the ingested data 1400 and the memory buffer 1402 may respectively be ingested data 1200 and the memory buffer 1202 shown in FIG. 12. A query execution pipeline 1004, which may, for example, be the query execution pipeline 1206 shown in FIG. 12, through one or more compute nodes thereof is able to access the ingested data 1400 within the memory buffer 1402 in response to the ingestion of the ingested data 1400 by a data store management component, for example, the data store management component 900 shown in FIG. 9.

In particular, the design of the data store management component and the data platform which includes it, for example, the data platform 300 shown in FIG. 3, enables newly arrived data such as the ingested data 1400 to be made available for query execution without first writing the data to storage and without first creating a copy of the data. This design enables immediate access to the newly arrived data for query execution, which may result in immediate analytical alerting and monitoring based on the newly arrived data with minimal ingestion and processing latency.

Thus, access to the ingested data 1400 within the memory buffer 1402 is made available to those compute nodes of the query execution pipeline 1004 before the ingested data 1400 is written to storage (e.g., a storage device 1406, which may, for example, be the storage device 1204 shown in FIG. 12 and is of a storage system 1408, which may, for example, be the storage system 1004 shown in FIG. 10) and without requiring creation of a copy of the ingested data 1400. The compute nodes of the query execution pipeline 1004 which are able to access the ingested data 1400 within the memory buffer 1402 may, for example, include a source faucet 1410. For example, the source faucet 1410 may use a memory pointer 1412 which identifies a memory location in the memory buffer 1402 at which the ingested data 1400 is stored to access the ingested data 1400 without requiring a creation of a copy of the ingested data 1400 in an additional memory location in the memory buffer 1402.

At some point after the query execution pipeline 1004 accesses the ingested data 1400 within the memory buffer 1402 for query execution, the data store management component uses recency of use information for a dataset corresponding to the ingested data to determine to purge the ingested data 1400 from the memory buffer 1402, such as by moving the ingested data 1400 to the storage device 1406. As has been described above, the memory buffer 1402 is of a limited size and thus cannot store all data for all datasets. Rather, to maintain both low latency in ingested data becoming available for query execution and in query execution itself, certain data is moved out of the memory buffer 1402 to make space available for data which is predicted to be used imminently by the query execution pipeline 1004.

Accordingly, the data store management component may ingest, as the ingested data 1400, data from one or more data sources directly into the memory buffer 1402, as a low-latency memory buffer. In response to ingesting the data, the query execution pipeline 1004, such as by the source faucet 1410 thereof, may access the ingested data in the memory buffer 1402 to execute a query without requiring creation of a copy of the ingested data 1400. Subsequent to executing the query, the data store management component may purge the ingested data 1400 from the memory buffer 1402 based on a recency of use of a dataset corresponding to the ingested data 1400 for query execution.

Figure 15:
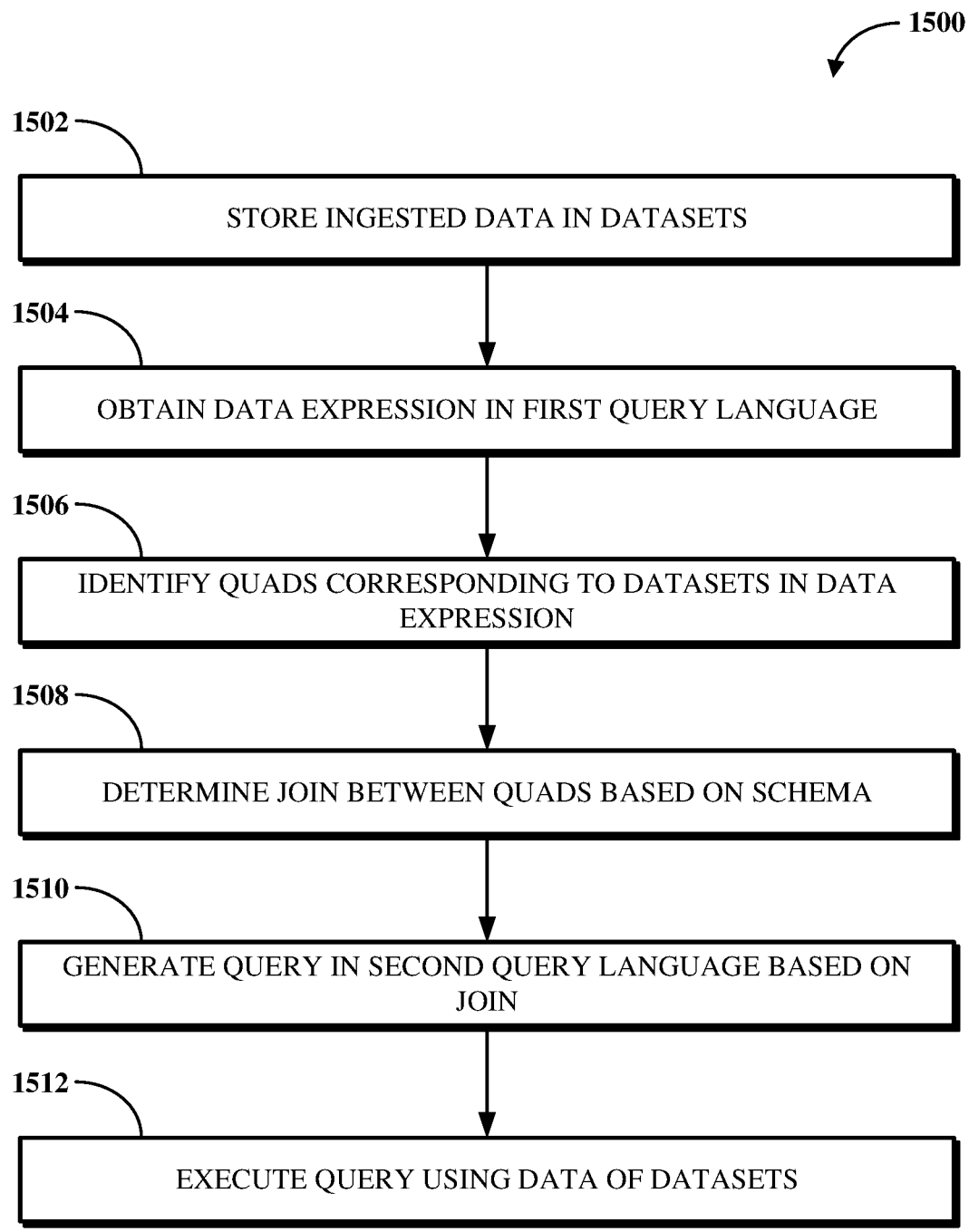
FIG. 15 is a flowchart of an example of a technique for query generation and processing.

To further describe some implementations in greater detail, reference is next made to examples of techniques which may be performed by or using a query generation and processing system. FIG. 15 is a flowchart of an example of a technique 1500 for query generation and processing. The technique 1500 can be executed using computing devices, such as the systems, hardware, and software described with respect to FIGS. 1-14. The technique 1500 can be performed, for example, by executing a machine-readable program or other computer-executable instructions, such as routines, instructions, programs, or other code. The steps, or operations, of the technique 1500 or another technique, method, process, or algorithm described in connection with the implementations disclosed herein can be implemented directly in hardware, firmware, software executed by hardware, circuitry, or a combination thereof.

For simplicity of explanation, the technique 1500 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1502, data ingested from one or more data sources is stored in a first dataset and a second dataset using a relational data store. The data stored in the first dataset and the second data set are stored directly into a low-latency memory buffer responsive to the ingestion of the data. The low-latency buffer may, for example, be a memory buffer of a blazer or a memory buffer of another device or virtual machine. The data is ingested from one or more data sources. For example, ingesting the data from the one or more data sources can include updating sequence numbers of tables maintained by tabloids according to rows being written into shards of those tables maintained by blazers within a same cluster as the tabloids and by the ingested data being stored in the low-latency buffer as a result of the update. In some implementations, the relational data store may store data in blocks, in which case the relational data store may be configured to move a block of the blocks between the memory buffer, a local storage, and the cold storage based on a predicted relevance of data stored in the block.

At 1504, a data expression in a first (e.g., simplified) query language is obtained, such as using a query generator. The data expression identifies a subset of data stored in a data store (e.g., a relational or NoSQL database maintained by or for a data platform). Obtaining the data expression may include the query generator (e.g., via an online development environment or data expression library) receiving input specifying the data expression from a user of the data platform. Alternatively, obtaining the data expression may include the data platform programmatically generating the data expression.

At 1506, a first quad corresponding to the first dataset and a second quad corresponding to the second dataset are identified from the data expression using the query generator. Each of the quads is represented by a data expression that identifies a subset of data stored by the relational data store. For example, the data expression may be a first data expression that includes a second data expression representing the first quad and a third data expression representing the second quad, in which the second and third data expressions are each substrings of the first data expression that satisfy the grammar of the first query language. Identifying the quads includes parsing the data expression. Parsing the data expression to determine the quads may include tokenizing (e.g., recursively) a string of the data expression to identify the quads. For example, parsing the data expression to determine the quads may include tokenizing a string of the data expression to identify the quads, parsing a stream of the tokenized string into a syntax stream, and normalizing the syntax stream into a canonical form. The quads include at least one dataset quad and at least one column quad. The first query language does not require an expression of a join relationship between a first quad and a second quad within the data expression when an unambiguous relationship between the first quad and the second quad is obtainable from a schema including a first element mappable to the first quad and a second element mappable to the second quad. A quad represents a valid data expression according to the first query language.

At 1508, an implicit join between the first quad and the second quad is determined using the query generator based on an unambiguous relationship obtainable from a schema of the first dataset and the second dataset. Determining the implicit join between the first quad and the second quad based on the unambiguous relationship obtainable from the schema of the first dataset and the second dataset includes generating a derivation graph including nodes representing the quads and including at least one edge representing a derivation relationship between two of the quads based on attributes of the quads, and querying the derivation graph based on a grain of the quads. The grain represents one or more dimensions of data stored by the relational data store. Generating the derivation graph includes producing a tree including leaves corresponding to the quads based on an arrangement of the quads within the data expression, recursively iterating through leaves of the tree to add nodes representing the quads to the derivation graph, and generating edges representing derivation relationships between the nodes.

For example, a tree of quads may be produced based on an arrangement of the quads within the tokenized string and a grammar of the first query language. Producing the tree includes converting the quads of the normalized syntax stream into a relational algebraic form. The tree includes a number of leaves each representing a quad. In some implementations, a quad at a first level of the tree includes quads at lower levels of the tree.

Next, a derivation graph may be generated based on the tree of quads. The derivation graph includes nodes representing the quads and including at least one edge representing a derivation relationship between two of the quads determined based on attributes of the quads. Generating the derivation graph includes recursively iterating through leaves of the tree to add the nodes representing the quads to the derivation graph and adding edges connecting sets of two of the nodes after all nodes have been added to the derivation graph. Alternatively, in some cases, the recursive iteration through the leaves of the tree may include generating a first edge between a first node and a second node of the nodes responsive to the first node being added to the derivation graph, and in which the second node was added to the derivation graph before the first node. Thus, in such cases, ones of the nodes are iteratively added to the derivation graph using the tree, and edges are generated between a node newly added to the derivation graph and a node previously added to the derivation graph.

The derivation graph may then be queried based on a grain of the quads. Querying the derivation graph based on the grain includes determining a join relationship between a first quad and a second quad within the data expression based on a grain of those quads and an edge between a first node representing the first quad and a second node representing the second quad within the derivation graph. The grain represents one or more dimensions of data associated with one or both of the first quad or the second quad. The grain may be determined based on an aggregation indicated in the data expression. The join relationship may indicate that a first grain of the first quad is derivable from a second grain of the second quad.

In some implementations, querying the derivation graph can include using a root node identified for a join included in the data expression in order to generate a join expression relating two datasets of the join through, for example, an intermediate dataset. For example, a first data expression (e.g., a first quad) may include a join between second and third data expressions (e.g., second and third quads) that are both substrings of the first data expression that satisfy the grammar of the first query language. The derivation graph may include at least one node representative of the second data expression and at least one node representative of the third data expression. However, evaluating the join based on the nodes representative of the second and third data expressions may include determining, for example, based on grains of the second and third data expressions, that neither of those data expressions derives the other. For example, evaluating the join may be deferred until a root node for the join is identified, such as based on a first derivability chain determined between a node representative of the second data expression and the root node and a second derivability chain determined between a node representative of the third data expression and the root node. In particular, the root node represents a highest deriving data expression associated with the join such that a schema element associated with the root node derives schema elements associated with each of the second and third data expressions. The root node may thus be used identify a join relationship between the second and third data expressions. The derivation graph may then be traversed through the root node. Traversing the derivation graph through the root node includes traversing the derivation graph from the node representative of the second data expression to the node representative of the third data expression through the root node using the derivability chains determined between the nodes representative of the second and third data expressions and the root node.

In some implementations, the root node is identified by determining that the nodes representative of the second data expression and the third data expression are derivable from the root node using the derivation graph. The root node is a node within the derivation graph which represents a highest deriving data expression associated with the join between the second and third data expressions. The nodes representative of the second data expression and the third data expression are considered to be derivable from the root node when values obtained using the nodes of the second data expression and the third data expression are computable given an intermediate value obtained using the root node. Identifying the root node includes determining a derivability chain (e.g., a unidirectional derivability chain) between a node representative of the second data expression and the root node and determining a derivability chain (e.g., a unidirectional derivability chain) between a node representative of the third data expression and the root node.

In some implementations, identifying the root node includes determining that a transitive closure of the root node includes the at least one node representative of the second data expression and the at least one node representative of the third data expression. For example, the transitive closure may be determined using a depth-first search, and the root node can be identified according to the transitive closure of the root node based on determinations that nodes representative of the second and third data expressions are encountered only once during the depth-first search.

At 1510, a query in a second (e.g., structured) query language is generated using the query generator based on the implicit join between the first quad and the second quad. Generating the query includes translating the data expression into the second query language including using join relationships determined by querying the derivation graph. The query in the second query language explicitly identifies such join relationships according to the grammar of the second query language, whereas, as described above, the simplified query language does require expressions of join relationships where schema unambiguously relates mappable elements of the quads therein.

At 1512, the query is executed using a query pipeline generated using a query processor, in which the query pipeline uses the data of the first dataset and the second dataset. The query pipeline includes one or more compute nodes instantiated based on a query plan for a query. The one or more compute nodes include alternating layers of faucets and turbines in which an upstream faucet transmits pointers to the ingested data to one or more downstream turbines. The storage of the data in the memory buffer enables the compute nodes of the query pipeline to access to the data without making a copy of the data and without waiting for the data to be stored in a cold storage. In some implementations, the upstream faucet may pull new data ingested by the relational data store on a periodic basis independent of a time period used to aggregate the data.

For example, the ingested data stored in the datasets may be accessed in the low-latency buffer to execute a query. The query is executed using a query execution pipeline, which includes one or more compute nodes instantiated based on a query plan for a query, in which the one or more compute nodes use pointers to the ingested data within a data store associated with the low-latency buffer (e.g., a relational data store) to execute the query. For example, a source faucet of a query execution pipeline may access the ingested data using a memory pointer identifying a location of the ingested data within the low-latency buffer. The ingested data is accessed in the low-latency buffer in response to the ingestion of the data directly into the low-latency buffer, such as to enable immediate or near immediate access to that data for query execution upon that data being obtained by the data store which stores it. The ingested data may thus be accessed within the low-latency buffer without requiring creation of a copy of the ingested data.

In some implementations, the query may be a second query executed using a static dataset maintained in the low-latency buffer following an earlier execution of a query. For example, data corresponding to a first dataset and data corresponding to a second dataset may be stored within a low-latency buffer. The low-latency buffer may, for example, be a memory buffer of a blazer or a memory buffer of another device or virtual machine. A first query may then be executed by computing a join between the first and second datasets. In particular, executing the first query by computing the join between the first dataset and the second dataset may include producing a first, original output using the data corresponding to the first dataset and the data corresponding to the second dataset that is stored in the low-latency buffer. For example, the data corresponding to the first and second datasets may be accessed by one or more compute nodes of a query execution pipeline using memory pointers identifying locations of those data in the low-latency buffer. Following execution of the first query, data corresponding to the first dataset may be maintained within the low-latency buffer and data corresponding to the second dataset may be purged from the low-latency buffer. The data corresponding to the first dataset is maintained within the low-latency buffer based on a determination that the first dataset is a static dataset. The data corresponding to the second dataset is purged from the low-latency buffer based on a determination that the second dataset is not a static dataset. In some implementations, the first dataset may be determined to be a static dataset based on the first dataset being a dimensional table. In some implementations, the first dataset may be determined to be a static dataset based on the first dataset being less likely to change than the second dataset. In some implementations, the first dataset may be determined to be a static dataset based on the first dataset having fewer records of data than the second dataset.

The query generated as described above may then be executed, as a second query, using the first dataset to produce a second output while data corresponding to the first dataset is maintained in the low-latency buffer. The second query may be the same as or different from the first query. The second query is executed to perform a query operation against the first dataset in which the query operation is optimized by the in-memory state of the first dataset. In some cases, the second query may involve computing a join between the first dataset and a third dataset. In some cases, the second query may involve computing an aggregation involving data of the first dataset. In some cases, the second query may involve computing an incremental join between the first dataset and additional data corresponding to the second dataset obtained after the execution of the first query. For example, the additional data may be ingested from a data source into the low-latency buffer without requiring that the additional data first be stored in a non-volatile, long-term storage device, such as a warm storage or a cold storage. For example, the additional data may be stored in the non-volatile storage device in parallel with the ingestion of the additional data into the low-latency buffer. Where the second query involves such an incremental join, the second output produced as a result of the computation may be an incremental output which can then be combined with the first output. For example, re-executing the query may include accessing the additional data using a pointer to the low-latency buffer at which the additional data is stored without requiring creation of a copy of the additional data in an additional memory location. For example, the pointer may identify a memory location in the low-latency buffer.

In some implementations, the relational data store, the query generator, and the query processor may be implemented on a common computing device. In some implementations, a web application or other software component, whether or not related to a data platform, that allows a user to write the data expression and to configure the data ingestion from the one or more data sources may output results of the executed query.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, Python, Ruby, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to hardware, mechanical or physical implementations, but can include software routines implemented in conjunction with hardware processors, etc. Likewise, the terms "system" or "tool" as used herein and in the figures, but in any event based on their context, may be understood as corresponding to a functional unit implemented using software, hardware (e.g., an integrated circuit, such as an application specific integrated circuit (ASIC)), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system for processing queries on batch and streaming datasets, the system comprising:

a relational data store configured to ingest data from one or more data sources and store data in a first dataset and a second dataset;

a query generator configured to interpret a data expression in a simplified query language to generate a query in a structured query language based on a first quad corresponding to the first dataset and a second quad corresponding to the second dataset identified based on the data expression and determining an implicit join between the first quad and the second quad based on an unambiguous relationship obtainable from a schema of the first dataset and the second dataset, wherein the data expression does not expressly identify a join between the first quad and the second quad; and a query processor configured to generate a query pipeline that uses the data of the first dataset and the second dataset stored by the relational data store to execute the query generated by the query processor, wherein the query pipeline includes one or more compute nodes instantiated based on a query plan for a query, wherein the one or more compute nodes include alternating layers of faucets and turbines, and wherein an upstream faucet transmits pointers to the ingested data to one or more downstream turbines.

2. The system of claim 1, wherein the relational data stores the data in the first dataset and the second data set directly into a memory buffer to enable compute nodes of the query pipeline to access to the data without making a copy of the data and without waiting for the data to be stored in a cold storage.

3. The system of claim 2, wherein the relational data store stores data in blocks, and wherein the relational data store is configured to move a block of the blocks between the memory buffer, a local storage, and the cold storage based on a predicted relevance of data stored in the block.

4. The system of claim 1, wherein the query generator is configured to parse the data expression to produce a tree of quads including the first quad and the second quad, generate a derivation graph including nodes representing the quads, and query the derivation graph based on a grain of the quads to generate the query.

5. The system of claim 4, wherein the grain represents one or more dimensions of data stored by the relational data store.

6. The system of claim 4, wherein each of the quads is represented by a data expression that identifies a subset of data stored by the relational data store.

7. The system of claim 1, wherein the upstream faucet pulls new data ingested by the relational data store on a periodic basis independent of a time period used to aggregate the data.

8. The system of claim 1, wherein the relational data store, the query generator, and the query processor are implemented on a common computing device.

9. The system of claim 1, wherein a web application that allows a user to write the data expression and to configure the data ingestion from the one or more data sources outputs results of the executed query.

10. A method for processing queries on batch and streaming datasets, the method comprising:
- storing data ingested from one or more data sources in a first dataset and a second dataset;
- obtaining a data expression in a simplified query language;
- identifying a first quad corresponding to the first dataset and a second quad corresponding to the second dataset based on the data expression, wherein the data expression does not expressly identify a join between the first quad and the second quad;
- determining an implicit join between the first quad and the second quad based on an unambiguous relationship obtainable from a schema of the first dataset and the second dataset, including:
  - generating a derivation graph including nodes representing the quads, the generating including producing a tree including leaves corresponding to the quads based on an arrangement of the quads within the data expression and recursively iterating through leaves of the tree to add nodes representing the quads to the derivation graph, and
  - querying the derivation graph based on a grain of the quads; and
- generating a query in a structured query language based on the implicit join between the first quad and the second quad; and
- executing the query using a query pipeline that uses the data of the first dataset and the second dataset.

11. The method of claim 10, wherein the data stored in the first dataset and the second data set are stored directly into a memory buffer to enable compute nodes of the query pipeline that executes the query to access to the data without making a copy of the data and without waiting for the data to be stored in a cold storage.

12. The method of claim 10, wherein the query pipeline includes one or more compute nodes instantiated based on a query plan for a query, wherein the one or more compute nodes include alternating layers of faucets and turbines, and wherein an upstream faucet transmits pointers to the ingested data to one or more downstream turbines.

13. An apparatus for processing queries on batch and streaming datasets, the apparatus comprising:
- a memory storing instructions; and
- a processor configured to execute the instructions to:
  - store data ingested from one or more data sources in a first dataset and a second dataset;
  - obtain a data expression in a simplified query language;
  - generate a query in a structured query language based on an implicit join determined between a first quad corresponding to the first dataset and a second quad corresponding to the second dataset based on an unambiguous relationship obtainable from a schema of the first dataset and the second dataset, wherein the data expression does not expressly identify a join between the first quad and the second quad; and
  - execute the query using a query pipeline that uses the data of the first dataset and the second dataset,
- wherein the data stored in the first dataset and the second data set are stored directly into a memory buffer to enable compute nodes of a query pipeline that executes the query to access to the data without making a copy of the data and without waiting for the data to be stored in a cold storage,
- wherein the query pipeline includes one or more compute nodes instantiated based on a query plan for a query, wherein the one or more compute nodes include alternating layers of faucets and turbines, and wherein an upstream faucet transmits pointers to the ingested data within the memory buffer to one or more downstream turbines.

14. The apparatus of claim 13, wherein the instructions to generate the query in the structured query language based on the implicit join include instructions to:
- generate a derivation graph including nodes representing the quads; and
- query the derivation graph based on a grain of the quads to determine the implicit join.

15. The apparatus of claim 13, wherein a web application that allows a user to write the data expression and to configure the data ingestion from the one or more data sources outputs results of the executed query.

* * * * *